US009942526B2

(12) United States Patent
Plante

(10) Patent No.: US 9,942,526 B2
(45) Date of Patent: *Apr. 10, 2018

(54) VEHICLE EVENT RECORDERS WITH INTEGRATED WEB SERVER

(71) Applicant: SMARTDRIVE SYSTEMS, INC., San Diego, CA (US)

(72) Inventor: James Plante, San Diego, CA (US)

(73) Assignee: SmartDrive Systems, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/201,385

(22) Filed: Jul. 1, 2016

(65) Prior Publication Data

US 2016/0316179 A1 Oct. 27, 2016

Related U.S. Application Data

(63) Continuation of application No. 14/634,688, filed on Feb. 27, 2015, now Pat. No. 9,402,060, which is a (Continued)

(51) Int. Cl.
*H04N 7/18* (2006.01)
*G06F 9/44* (2018.01)
(Continued)

(52) U.S. Cl.
CPC .......... *H04N 7/188* (2013.01); *G06F 9/4443* (2013.01); *G06F 17/30864* (2013.01);
(Continued)

(58) Field of Classification Search
CPC .. H04N 7/188; H04N 5/23206; G06F 9/4443; G06F 17/30864; G07C 5/008;
(Continued)

(56) References Cited

U.S. PATENT DOCUMENTS 2,943,141 A * 6/1960 Knight ............... A63B 24/0003
33/443
3,634,866 A * 1/1972 Meyer ..................... G07C 5/12
340/604
(Continued)

FOREIGN PATENT DOCUMENTS

CA 2469728 12/2005
CA 2469728 A1 12/2005
(Continued)

OTHER PUBLICATIONS

World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011. (1 pg.).
(Continued)

*Primary Examiner* — Gertrude Arthur Jeanglaude
(74) *Attorney, Agent, or Firm* — Sheppard Mullin Richter & Hampton LLP

(57) ABSTRACT

Vehicle event recorders are arranged with integrated web servers to provide a simple user interface and control mechanism which may be address with commonly available hardware and software. A vehicle event recorder of these inventions couples to a network having a workstation node. The workstation having either of the many available web browsers can be used to view, address, control, perform data transfer, et cetera, by way of data exchange in accordance with simple IP protocols. A vehicle equipped with these systems returns to a household to make a network connection. A local server is used to see all exposed system controls as provided by predefined web pages provided by a web server integrated as part of the vehicle event recorder unit.

21 Claims, 9 Drawing Sheets

Related U.S. Application Data continuation of application No. 11/377,164, filed on Mar. 16, 2006, now Pat. No. 8,996,240.

(51) Int. Cl.
| | |
|---|---|
| *G07C 5/00* | (2006.01) |
| *G07C 5/08* | (2006.01) |
| *H04L 29/06* | (2006.01) |
| *H04L 29/08* | (2006.01) |
| *H04L 12/24* | (2006.01) |
| *H04N 5/232* | (2006.01) |
| *G06F 17/30* | (2006.01) |
| *H04N 5/77* | (2006.01) |

(52) U.S. Cl.
CPC ............ *G07C 5/008* (2013.01); *G07C 5/085* (2013.01); *G07C 5/0891* (2013.01); *H04L 41/22* (2013.01); *H04L 65/60* (2013.01); *H04L 67/12* (2013.01); *H04L 67/42* (2013.01); *H04N 5/23206* (2013.01); *H04N 5/23216* (2013.01); *H04N 5/77* (2013.01); *H04N 7/181* (2013.01); *H04N 7/183* (2013.01)

(58) Field of Classification Search
CPC ....... G07C 5/085; G07C 5/0891; H04L 41/22; H04L 65/60; H04L 67/12; H04L 67/42
USPC ................. 701/33.3, 33.4, 35; 340/539.16
See application file for complete search history.

(56) References Cited

U.S. PATENT DOCUMENTS

| | | | |
|---|---|---|---|
| 3,781,824 A * | 12/1973 | Caiati | G07C 5/085 346/33 R |
| 3,812,287 A * | 5/1974 | Lemelson | G08B 13/19602 348/155 |
| 3,885,090 A | 5/1975 | Rosenbaum | |
| 3,992,656 A | 11/1976 | Joy | |
| 4,054,752 A | 10/1977 | Dennis, Jr. | |
| 4,072,850 A | 2/1978 | McGlynn | |
| 4,258,421 A | 3/1981 | Juhasz | |
| 4,271,358 A | 6/1981 | Schwarz | |
| 4,276,609 A | 6/1981 | Patel | |
| 4,280,151 A | 7/1981 | Tsunekawa | |
| 4,281,354 A | 7/1981 | Conte | |
| 4,401,976 A | 8/1983 | Stadelmayr | |
| 4,409,670 A | 10/1983 | Herndon | |
| 4,420,773 A | 12/1983 | Toyoda | |
| 4,425,097 A | 1/1984 | Owens | |
| 4,456,931 A | 6/1984 | Toyoda | |
| 4,489,351 A | 12/1984 | dAlayer de Costemore dArc | |
| 4,496,995 A | 1/1985 | Colles | |
| 4,500,868 A | 2/1985 | Tokitsu | |
| 4,528,547 A | 7/1985 | Rodney | |
| 4,533,962 A | 8/1985 | Decker | |
| 4,558,379 A | 12/1985 | Hu/tter | |
| 4,588,267 A | 5/1986 | Pastore | |
| 4,593,313 A | 6/1986 | Nagasaki | |
| 4,621,335 A | 11/1986 | Bluish | |
| 4,625,210 A | 11/1986 | Sagl | |
| 4,630,110 A | 12/1986 | Cotton | |
| 4,632,348 A | 12/1986 | Keesling | |
| 4,638,289 A | 1/1987 | Zottnik | |
| 4,646,241 A | 2/1987 | Ratchford | |
| 4,651,143 A | 3/1987 | Yamanaka | |
| 4,671,111 A | 6/1987 | Lemelson | |
| 4,718,685 A | 1/1988 | Kawabe | |
| 4,754,255 A | 6/1988 | Sanders | |
| 4,758,888 A | 7/1988 | Lapidot | |
| 4,763,745 A | 8/1988 | Eto | |
| 4,785,474 A | 11/1988 | Bernstein | |
| 4,789,904 A | 12/1988 | Peterson | |
| 4,794,566 A | 12/1988 | Richards | |
| 4,804,937 A | 2/1989 | Barbiaux | |
| 4,806,931 A | 2/1989 | Nelson | |
| 4,807,096 A | 2/1989 | Skogler | |
| 4,814,896 A | 3/1989 | Heitzman | |
| 4,837,628 A | 6/1989 | Sasaki | |
| 4,839,631 A | 6/1989 | Tsuji | |
| 4,843,463 A | 6/1989 | Michetti | |
| 4,843,578 A | 6/1989 | Wade | |
| 4,853,856 A | 8/1989 | Hanway | |
| 4,853,859 A | 8/1989 | Morita | |
| 4,866,616 A | 9/1989 | Takeuchi | |
| 4,876,597 A | 10/1989 | Roy | |
| 4,883,349 A | 11/1989 | Mittelhauser | |
| 4,896,855 A | 1/1990 | Furnish | |
| 4,926,331 A | 5/1990 | Windle | |
| 4,930,742 A | 6/1990 | Schofield | |
| 4,936,533 A | 6/1990 | Adams | |
| 4,939,652 A | 7/1990 | Steiner | |
| 4,942,464 A | 7/1990 | Milatz | |
| 4,945,244 A | 7/1990 | Castleman | |
| 4,949,186 A | 8/1990 | Peterson | |
| 4,980,913 A | 12/1990 | Skret | |
| 4,987,541 A | 1/1991 | Levente | |
| 4,992,943 A | 2/1991 | McCracken | |
| 4,993,068 A | 2/1991 | Piosenka | |
| 4,995,086 A | 2/1991 | Lilley | |
| 5,012,335 A | 4/1991 | Cohodar | |
| 5,027,104 A | 6/1991 | Reid | |
| 5,046,007 A | 9/1991 | McCrery | |
| 5,050,166 A | 9/1991 | Cantoni | |
| 5,056,056 A | 10/1991 | Gustin | |
| 5,057,820 A | 10/1991 | Markson | |
| 5,096,287 A | 3/1992 | Kakinami | |
| 5,100,095 A | 3/1992 | Haan | |
| 5,111,289 A | 5/1992 | Lucas | |
| 5,140,434 A | 8/1992 | Van Blessinger | |
| 5,140,436 A | 8/1992 | Blessinger | |
| 5,140,438 A | 8/1992 | Kurahashi | |
| 5,144,661 A | 9/1992 | Shamosh | |
| 5,178,448 A | 1/1993 | Adams | |
| 5,185,700 A | 2/1993 | Bezos | |
| 5,196,938 A | 3/1993 | Blessinger | |
| 5,223,844 A | 6/1993 | Mansell | |
| 5,224,211 A | 6/1993 | Roe | |
| 5,262,813 A | 11/1993 | Scharton | |
| 5,283,433 A | 2/1994 | Tsien | |
| 5,294,978 A | 3/1994 | Katayama | |
| 5,305,214 A | 4/1994 | Komatsu | |
| 5,305,216 A | 4/1994 | Okura | |
| 5,308,247 A | 5/1994 | Dyrdek | |
| 5,309,485 A | 5/1994 | Chao | |
| 5,311,197 A | 5/1994 | Sorden | |
| 5,321,753 A | 6/1994 | Gritton | |
| 5,327,288 A | 7/1994 | Wellington | |
| 5,330,149 A | 7/1994 | Haan | |
| 5,333,759 A | 8/1994 | Deering | |
| 5,343,527 A | 8/1994 | Moore | |
| 5,353,023 A | 10/1994 | Mitsugi | |
| 5,361,326 A | 11/1994 | Aparicio, IV | |
| 5,387,926 A | 2/1995 | Bellan | |
| 5,388,045 A | 2/1995 | Kamiya | |
| 5,388,208 A | 2/1995 | Weingartner | |
| 5,404,330 A | 4/1995 | Lee | |
| 5,408,330 A | 4/1995 | Squicciarini | |
| 5,422,543 A | 6/1995 | Weinberg | |
| 5,430,431 A | 7/1995 | Nelson | |
| 5,430,432 A | 7/1995 | Camhi | |
| 5,435,184 A | 7/1995 | Pineroli | |
| 5,445,024 A | 8/1995 | Riley, Jr. | |
| 5,445,027 A | 8/1995 | Zorner | |
| 5,446,659 A | 8/1995 | Yamawaki | |
| 5,455,625 A | 10/1995 | Englander | |
| 5,455,716 A | 10/1995 | Suman | |
| 5,465,079 A | 11/1995 | Bouchard | |
| 5,473,729 A | 12/1995 | Bryant | |
| 5,477,141 A | 12/1995 | Nather | |
| 5,495,242 A | 2/1996 | Kick | |
| 5,495,243 A | 2/1996 | McKenna | |
| 5,497,419 A | 3/1996 | Hill | |

(56) References Cited

U.S. PATENT DOCUMENTS

| | | |
|---|---|---|
| 5,499,182 A | 3/1996 | Ousborne |
| 5,504,482 A | 4/1996 | Schreder |
| 5,513,011 A | 4/1996 | Matsumoto |
| 5,515,285 A | 5/1996 | Garrett, Sr. |
| 5,519,260 A | 5/1996 | Washington |
| 5,521,633 A | 5/1996 | Nakajima |
| 5,523,811 A | 6/1996 | Wada |
| 5,526,269 A | 6/1996 | Ishibashi |
| 5,530,420 A | 6/1996 | Tsuchiya |
| 5,532,678 A | 7/1996 | Kin |
| 5,537,156 A | 7/1996 | Katayama |
| 5,539,454 A | 7/1996 | Williams |
| 5,541,590 A | 7/1996 | Nishio |
| 5,544,060 A | 8/1996 | Fujii |
| 5,546,191 A | 8/1996 | Hibi |
| 5,546,305 A | 8/1996 | Kondo |
| 5,548,273 A | 8/1996 | Nicol |
| 5,552,990 A | 9/1996 | Ihara |
| 5,559,496 A | 9/1996 | Dubats |
| 5,568,211 A | 10/1996 | Bamford |
| 5,570,087 A | 10/1996 | Lemelson |
| 5,570,127 A | 10/1996 | Schmidt |
| 5,574,424 A | 11/1996 | Nguyen |
| 5,574,443 A | 11/1996 | Hsieh |
| D376,571 S | 12/1996 | Kokat |
| 5,581,464 A | 12/1996 | Woll |
| 5,586,130 A | 12/1996 | Doyle |
| 5,590,948 A | 1/1997 | Moreno |
| 5,596,382 A | 1/1997 | Bamford |
| 5,596,647 A | 1/1997 | Wakai |
| 5,600,775 A | 2/1997 | King |
| 5,608,272 A | 3/1997 | Tanguay |
| 5,610,580 A | 3/1997 | Lai |
| 5,612,686 A | 3/1997 | Takano |
| 5,631,638 A | 5/1997 | Kaspar |
| 5,638,273 A | 6/1997 | Coiner |
| 5,642,106 A | 6/1997 | Hancock |
| 5,646,856 A | 7/1997 | Kaesser |
| 5,652,706 A | 7/1997 | Morimoto |
| RE35,590 E | 8/1997 | Bezos |
| 5,654,892 A | 8/1997 | Fujii |
| 5,659,355 A | 8/1997 | Barron |
| 5,666,120 A | 9/1997 | Kline |
| 5,667,176 A | 9/1997 | Zamarripa |
| 5,669,698 A | 9/1997 | Veldman |
| 5,671,451 A | 9/1997 | Takahashi |
| 5,677,979 A | 10/1997 | Squicciarini |
| 5,680,117 A | 10/1997 | Arai |
| 5,680,123 A | 10/1997 | Lee |
| 5,686,765 A | 11/1997 | Washington |
| 5,686,889 A | 11/1997 | Hillis |
| 5,689,442 A | 11/1997 | Swanson |
| 5,696,705 A | 12/1997 | Zykan |
| 5,706,362 A | 1/1998 | Yabe |
| 5,706,909 A | 1/1998 | Bevins |
| 5,712,679 A | 1/1998 | Coles |
| 5,717,456 A | 2/1998 | Rudt |
| 5,719,554 A | 2/1998 | Gagnon |
| 5,758,299 A | 5/1998 | Sandborg |
| 5,781,101 A | 7/1998 | Stephen |
| 5,781,145 A | 7/1998 | Williams |
| 5,784,007 A | 7/1998 | Pepper |
| 5,784,021 A | 7/1998 | Oliva |
| 5,784,521 A | 7/1998 | Nakatani |
| 5,790,403 A | 8/1998 | Nakayama |
| 5,790,973 A | 8/1998 | Blaker |
| 5,793,308 A | 8/1998 | Rosinski |
| 5,793,420 A | 8/1998 | Schmidt |
| 5,793,739 A | 8/1998 | Tanaka |
| 5,793,985 A | 8/1998 | Natarajan |
| 5,794,165 A | 8/1998 | Minowa |
| 5,797,134 A | 8/1998 | McMillan |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank |
| 5,805,079 A | 9/1998 | Lemelson |
| 5,813,745 A | 9/1998 | Fant, Jr. |
| 5,815,071 A | 9/1998 | Doyle |
| 5,815,093 A | 9/1998 | Kikinis |
| 5,819,198 A | 10/1998 | Peretz |
| 5,825,284 A | 10/1998 | Dunwoody |
| 5,825,412 A | 10/1998 | Hobson |
| 5,844,505 A | 12/1998 | Van Ryzin |
| 5,845,733 A | 12/1998 | Wolfsen |
| 5,867,802 A | 2/1999 | Borza |
| 5,877,897 A | 3/1999 | Schofield |
| 5,896,167 A | 4/1999 | Omae |
| 5,897,602 A | 4/1999 | Mizuta |
| 5,897,606 A | 4/1999 | Miura |
| 5,899,956 A | 5/1999 | Chan |
| 5,901,806 A | 5/1999 | Takahashi |
| 5,914,748 A | 6/1999 | Parulski |
| 5,919,239 A | 7/1999 | Fraker |
| 5,926,210 A | 7/1999 | Hackett |
| 5,928,291 A | 7/1999 | Jenkins |
| 5,938,321 A | 8/1999 | Bos |
| 5,946,404 A | 8/1999 | Bakshi |
| 5,948,038 A | 9/1999 | Daly |
| 5,959,367 A | 9/1999 | OFarrell |
| 5,978,017 A | 11/1999 | Tino |
| 6,002,326 A | 12/1999 | Turner |
| 6,006,148 A | 12/1999 | Strong |
| 6,008,723 A | 12/1999 | Yassan |
| 6,008,841 A | 12/1999 | Charlson |
| 6,009,370 A | 12/1999 | Minowa |
| 6,011,492 A | 1/2000 | Garesche |
| 6,028,528 A | 2/2000 | Lorenzetti |
| 6,037,860 A | 3/2000 | Zander |
| 6,037,977 A | 3/2000 | Peterson |
| 6,041,410 A | 3/2000 | Hsu |
| 6,049,079 A | 4/2000 | Noordam |
| 6,057,754 A | 5/2000 | Kinoshita |
| 6,060,989 A | 5/2000 | Gehlot |
| 6,064,792 A | 5/2000 | Fox |
| 6,067,488 A | 5/2000 | Tano |
| 6,076,026 A | 6/2000 | Jambhekar |
| 6,084,870 A | 7/2000 | Wooten |
| 6,088,635 A | 7/2000 | Cox |
| 6,092,008 A | 7/2000 | Bateman |
| 6,092,021 A | 7/2000 | Ehlbeck |
| 6,092,193 A | 7/2000 | Loomis |
| 6,100,811 A | 8/2000 | Hsu |
| 6,111,254 A | 8/2000 | Eden |
| 6,118,768 A | 9/2000 | Bhatia |
| 6,122,738 A | 9/2000 | Millard |
| 6,141,611 A | 10/2000 | Mackey |
| 6,144,296 A | 11/2000 | Ishida |
| 6,147,598 A | 11/2000 | Murphy |
| 6,151,065 A | 11/2000 | Steed |
| 6,163,338 A | 12/2000 | Johnson |
| 6,163,749 A | 12/2000 | McDonough |
| 6,167,186 A | 12/2000 | Kawasaki |
| 6,170,742 B1 | 1/2001 | Yacoob |
| 6,181,373 B1 | 1/2001 | Coles |
| 6,182,010 B1 | 1/2001 | Berstis |
| 6,185,490 B1 | 2/2001 | Ferguson |
| 6,195,605 B1 | 2/2001 | Tabler |
| 6,200,139 B1 | 3/2001 | Clapper |
| 6,208,919 B1 | 3/2001 | Barkesseh |
| 6,211,907 B1 | 4/2001 | Scaman |
| 6,218,960 B1 | 4/2001 | Ishikawa |
| 6,246,933 B1 | 6/2001 | Bague |
| 6,246,934 B1 | 6/2001 | Otake |
| 6,252,544 B1 | 6/2001 | Hoffberg |
| 6,253,129 B1 | 6/2001 | Jenkins |
| 6,259,475 B1 | 7/2001 | Ramachandran |
| 6,263,265 B1 | 7/2001 | Fera |
| 6,266,588 B1 | 7/2001 | McClellan |
| 6,298,290 B1 | 10/2001 | Abe |
| 6,300,875 B1 | 10/2001 | Schafer |
| 6,324,450 B1 | 11/2001 | Iwama |
| 6,333,759 B1 | 12/2001 | Mazzilli |
| 6,337,622 B1 | 1/2002 | Sugano |

(56) References Cited

U.S. PATENT DOCUMENTS

| | | |
|---|---|---|
| 6,349,250 B1 | 2/2002 | Hart |
| 6,353,734 B1 | 3/2002 | Wright |
| 6,356,823 B1 | 3/2002 | Iannotti |
| 6,360,147 B1 | 3/2002 | Lee |
| 6,366,207 B1 | 4/2002 | Murphy |
| 6,389,339 B1 | 5/2002 | Just |
| 6,389,340 B1 | 5/2002 | Rayner |
| 6,400,835 B1 | 6/2002 | Lemelson |
| 6,405,112 B1 | 6/2002 | Rayner |
| 6,405,132 B1 | 6/2002 | Breed |
| 6,408,232 B1 | 6/2002 | Cannon |
| 6,411,874 B2 | 6/2002 | Morgan |
| 6,421,080 B1 | 7/2002 | Lambert |
| 6,434,510 B1 | 8/2002 | Callaghan |
| 6,449,540 B1 | 9/2002 | Rayner |
| 6,456,321 B1 | 9/2002 | Ito |
| 6,459,988 B1 | 10/2002 | Fan |
| 6,470,241 B2 | 10/2002 | Yoshikawa |
| 6,472,771 B1 | 10/2002 | Frese |
| 6,490,513 B1 | 12/2002 | Fish |
| 6,493,650 B1 | 12/2002 | Rodgers |
| 6,505,106 B1 | 1/2003 | Lawrence |
| 6,507,838 B1 | 1/2003 | Syeda-Mahmood |
| 6,508,400 B1 | 1/2003 | Ishifuji |
| 6,516,256 B1 | 2/2003 | Hartmann |
| 6,518,881 B2 | 2/2003 | Monroe |
| 6,525,672 B2 | 2/2003 | Chainer |
| 6,529,159 B1 | 3/2003 | Fan |
| 6,535,804 B1 | 3/2003 | Chun |
| 6,552,682 B1 | 4/2003 | Fan |
| 6,556,905 B1 | 4/2003 | Mittelsteadt |
| 6,559,769 B2 | 5/2003 | Anthony |
| 6,574,538 B2 | 6/2003 | Sasaki |
| 6,575,902 B1 | 6/2003 | Burton |
| 6,580,373 B1 | 6/2003 | Ohashi |
| 6,580,983 B2 | 6/2003 | Laguer-Diaz |
| 6,593,848 B1 | 7/2003 | Atkins |
| 6,594,576 B2 | 7/2003 | Fan |
| 6,611,740 B2 | 8/2003 | Lowrey |
| 6,611,755 B1 | 8/2003 | Coffee |
| 6,624,611 B2 | 9/2003 | Kirmuss |
| 6,629,029 B1 | 9/2003 | Giles |
| 6,629,030 B2 | 9/2003 | Klausner |
| 6,636,791 B2 | 10/2003 | Okada |
| 6,664,922 B1 | 12/2003 | Fan |
| 6,665,613 B2 | 12/2003 | Duvall |
| 6,679,702 B1 | 1/2004 | Rau |
| 6,684,137 B2 | 1/2004 | Takagi |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,721,652 B1 | 4/2004 | Sanqunetti |
| 6,728,612 B1 | 4/2004 | Carver |
| 6,732,031 B1 | 5/2004 | Lightner |
| 6,732,032 B1 | 5/2004 | Banet |
| 6,735,503 B2 | 5/2004 | Ames |
| 6,737,954 B2 | 5/2004 | Chainer |
| 6,738,697 B2 | 5/2004 | Breed |
| 6,739,078 B2 | 5/2004 | Morley |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg |
| 6,762,513 B2 | 7/2004 | Landgraf |
| 6,779,716 B1 | 8/2004 | Grow |
| 6,795,017 B1 | 9/2004 | Puranik |
| 6,795,111 B1 | 9/2004 | Mazzilli |
| 6,795,759 B2 | 9/2004 | Doyle |
| 6,798,743 B1 | 9/2004 | Ma |
| 6,804,590 B2 | 10/2004 | Sato |
| 6,810,362 B2 | 10/2004 | Adachi |
| 6,812,831 B2 | 11/2004 | Ikeda |
| 6,819,989 B2 | 11/2004 | Maeda |
| 6,831,556 B1 | 12/2004 | Boykin |
| 6,832,140 B2 | 12/2004 | Fan |
| 6,832,141 B2 | 12/2004 | Skeen |
| 6,836,712 B2 | 12/2004 | Nishina |
| 6,842,762 B2 | 1/2005 | Raithel |
| 6,847,873 B1 | 1/2005 | Li |
| 6,850,823 B2 | 2/2005 | Eun |
| 6,859,695 B2 | 2/2005 | Klausner |
| 6,859,705 B2 | 2/2005 | Rao |
| 6,862,524 B1 | 3/2005 | Nagda |
| 6,865,457 B1 | 3/2005 | Mittelsteadt |
| 6,867,733 B2 | 3/2005 | Sandhu |
| 6,873,261 B2 | 3/2005 | Anthony |
| 6,882,313 B1 | 4/2005 | Fan |
| 6,882,912 B2 | 4/2005 | DiLodovico |
| 6,894,606 B2 | 5/2005 | Forbes |
| 6,895,248 B1 | 5/2005 | Akyol |
| 6,898,492 B2 | 5/2005 | deLeon |
| 6,898,493 B2 | 5/2005 | Ehrman |
| 6,919,823 B1 | 7/2005 | Lock |
| 6,922,566 B2 | 7/2005 | Puranik |
| 6,928,348 B1 | 8/2005 | Lightner |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,988,034 B1 | 1/2006 | Marlatt |
| 7,003,289 B1 | 2/2006 | Kolls |
| 7,012,632 B2 | 3/2006 | Freeman |
| 7,020,548 B2 | 3/2006 | Saito |
| 7,023,333 B2 | 4/2006 | Blanco |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,082,382 B1 | 7/2006 | Rose, Jr. |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,113,853 B2 | 9/2006 | Hecklinger |
| 7,117,075 B1 | 10/2006 | Larschan |
| 7,119,832 B2 | 10/2006 | Blanco |
| 7,138,904 B1 | 11/2006 | Dutu |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,254,482 B2 | 8/2007 | Kawasaki |
| 7,265,663 B2 | 9/2007 | Steele |
| 7,266,507 B2 | 9/2007 | Simon |
| 7,272,179 B2 | 9/2007 | Siemens |
| 7,308,341 B2 | 12/2007 | Schofield |
| 7,317,974 B2 | 1/2008 | Luskin |
| 7,343,306 B1 | 3/2008 | Bates |
| 7,348,895 B2 | 3/2008 | Lagassey |
| 7,349,027 B2 | 3/2008 | Endo |
| 7,370,261 B2 | 5/2008 | Winarski |
| 7,382,933 B2 | 6/2008 | Dorai |
| 7,386,376 B2 | 6/2008 | Basir |
| 7,389,178 B2 | 6/2008 | Raz |
| 7,398,140 B2 | 7/2008 | Kernwein |
| 7,457,693 B2 | 11/2008 | Olsen |
| 7,471,189 B2 | 12/2008 | Vastad |
| 7,471,192 B2 | 12/2008 | Hara |
| 7,536,457 B2 | 5/2009 | Miller |
| 7,548,586 B1 | 6/2009 | Mimar |
| 7,561,054 B2 | 7/2009 | Raz |
| 7,584,033 B2 | 9/2009 | Mittelsteadt |
| 7,623,754 B1 | 11/2009 | McKain |
| 7,659,827 B2 | 2/2010 | Gunderson |
| 7,659,835 B2 | 2/2010 | Jung |
| 7,667,731 B2 | 2/2010 | Kreiner |
| 7,689,001 B2 | 3/2010 | Kim |
| 7,702,442 B2 | 4/2010 | Takenaka |
| 7,725,216 B2 | 5/2010 | Kim |
| 7,768,548 B2 | 8/2010 | Silvernail |
| 7,769,499 B2 | 8/2010 | McQuade |

(56) References Cited

U.S. PATENT DOCUMENTS

| | | |
|---|---|---|
| 7,783,956 B2 | 8/2010 | Ko |
| 7,804,426 B2 | 9/2010 | Etcheson |
| 7,821,421 B2 | 10/2010 | Tamir |
| 7,845,560 B2 | 12/2010 | Emanuel |
| 7,853,376 B2 | 12/2010 | Peng |
| 7,868,912 B2 | 1/2011 | Venetianer |
| 7,893,958 B1 | 2/2011 | Dagostino |
| 7,940,250 B2 | 5/2011 | Forstall |
| 7,941,258 B1 | 5/2011 | Mittelsteadt |
| 7,974,748 B2 | 7/2011 | Goerick |
| 8,054,168 B2 | 11/2011 | McCormick |
| 8,068,979 B2 | 11/2011 | Breed |
| 8,090,598 B2 | 1/2012 | Bauer |
| 8,113,844 B2 | 2/2012 | Huang |
| 8,139,820 B2 | 3/2012 | Plante |
| 8,140,265 B2 | 3/2012 | Grush |
| 8,140,358 B1 | 3/2012 | Ling |
| 8,152,198 B2 | 4/2012 | Breed |
| 8,239,092 B2 | 8/2012 | Plante |
| 8,269,617 B2 | 9/2012 | Cook |
| 8,311,858 B2 | 11/2012 | Everett |
| 8,314,708 B2 | 11/2012 | Gunderson |
| 8,321,066 B2 | 11/2012 | Becker |
| 8,373,567 B2 | 2/2013 | Denson |
| 8,417,562 B1 | 4/2013 | Siemens |
| 8,442,690 B2 | 5/2013 | Goldstein |
| 8,471,701 B2 | 6/2013 | Yariv |
| 8,508,353 B2 | 8/2013 | Cook |
| 8,538,696 B1 | 9/2013 | Cassanova |
| 8,538,785 B2 | 9/2013 | Coleman |
| 8,564,426 B2 | 10/2013 | Cook |
| 8,564,446 B2 | 10/2013 | Gunderson |
| 8,571,755 B2 | 10/2013 | Plante |
| 8,577,703 B2 | 11/2013 | McClellan |
| 8,606,492 B1 | 12/2013 | Botnen |
| 8,634,958 B1 | 1/2014 | Chiappetta |
| 8,635,557 B2 | 1/2014 | Geise |
| 8,676,428 B2 | 3/2014 | Richardson |
| 8,744,642 B2 | 6/2014 | Nemat-Nasser |
| 8,775,067 B2 | 7/2014 | Cho |
| 8,781,292 B1 | 7/2014 | Ross |
| 8,803,695 B2 | 8/2014 | Denson |
| 8,805,110 B2 | 8/2014 | Rhoads |
| 8,849,501 B2 | 9/2014 | Cook |
| 8,855,847 B2 | 10/2014 | Uehara |
| 8,862,395 B2 | 10/2014 | Richardson |
| 8,868,288 B2 | 10/2014 | Plante |
| 8,880,279 B2 | 11/2014 | Plante |
| 8,892,310 B1 | 11/2014 | Palmer |
| 8,989,959 B2 | 3/2015 | Plante |
| 8,996,234 B1 | 3/2015 | Tamari |
| 8,996,240 B2 | 3/2015 | Plante |
| 9,047,721 B1 | 6/2015 | Botnen |
| 9,085,362 B1 | 7/2015 | Kilian |
| 9,183,679 B2 | 11/2015 | Plante |
| 9,201,842 B2 | 12/2015 | Plante |
| 9,208,129 B2 | 12/2015 | Plante |
| 9,226,004 B1 | 12/2015 | Plante |
| 9,240,079 B2 | 1/2016 | Lambert |
| 9,607,526 B1 | 3/2017 | Hsu-Hoffman |
| 2001/0005217 A1 | 6/2001 | Hamilton |
| 2001/0005804 A1 | 6/2001 | Rayner |
| 2001/0018628 A1 | 8/2001 | Jenkins |
| 2001/0020204 A1 | 9/2001 | Runyon |
| 2001/0052730 A1 | 12/2001 | Baur |
| 2002/0019689 A1 | 2/2002 | Harrison |
| 2002/0027502 A1 | 3/2002 | Mayor |
| 2002/0029109 A1 | 3/2002 | Wong |
| 2002/0035422 A1 | 3/2002 | Sasaki |
| 2002/0044225 A1 | 4/2002 | Rakib |
| 2002/0059453 A1 | 5/2002 | Eriksson |
| 2002/0061758 A1 | 5/2002 | Zarlengo |
| 2002/0067076 A1 | 6/2002 | Talbot |
| 2002/0087240 A1 | 7/2002 | Raithel |
| 2002/0091473 A1 | 7/2002 | Gardner |
| 2002/0105438 A1 | 8/2002 | Forbes |
| 2002/0107619 A1 | 8/2002 | Klausner |
| 2002/0111725 A1 | 8/2002 | Burge |
| 2002/0111756 A1 | 8/2002 | Modgil |
| 2002/0118206 A1 | 8/2002 | Knittel |
| 2002/0120374 A1 | 8/2002 | Douros |
| 2002/0135679 A1 | 9/2002 | Scaman |
| 2002/0138587 A1 | 9/2002 | Koehler |
| 2002/0163532 A1 | 11/2002 | Thomas |
| 2002/0169529 A1 | 11/2002 | Kim |
| 2002/0169530 A1 | 11/2002 | Laguer-Diaz |
| 2002/0183905 A1 | 12/2002 | Maeda |
| 2003/0016753 A1 | 1/2003 | Kim |
| 2003/0028298 A1 | 2/2003 | Macky |
| 2003/0053433 A1 | 3/2003 | Chun |
| 2003/0055557 A1 | 3/2003 | Dutta |
| 2003/0065805 A1 | 4/2003 | Barnes |
| 2003/0067541 A1 | 4/2003 | Joao |
| 2003/0079041 A1 | 4/2003 | Parrella |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0112133 A1 | 6/2003 | Webb |
| 2003/0125854 A1 | 7/2003 | Kawasaki |
| 2003/0144775 A1 | 7/2003 | Klausner |
| 2003/0152145 A1 | 8/2003 | Kawakita |
| 2003/0154009 A1 | 8/2003 | Basir |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters |
| 2003/0214585 A1 | 11/2003 | Bakewell |
| 2003/0220835 A1 | 11/2003 | Barnes |
| 2003/0222880 A1 | 12/2003 | Waterman |
| 2004/0008255 A1 | 1/2004 | Lewellen |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1 | 3/2004 | Bauer |
| 2004/0044592 A1 | 3/2004 | Ubik |
| 2004/0054444 A1 | 3/2004 | Abeska |
| 2004/0054513 A1 | 3/2004 | Laird |
| 2004/0054689 A1 | 3/2004 | Salmonsen |
| 2004/0064245 A1 | 4/2004 | Knockeart |
| 2004/0070926 A1 | 4/2004 | Boykin |
| 2004/0083041 A1 | 4/2004 | Skeen |
| 2004/0088090 A1 | 5/2004 | Wee |
| 2004/0103008 A1 | 5/2004 | Wahlbin |
| 2004/0103010 A1 | 5/2004 | Wahlbin |
| 2004/0104842 A1 | 6/2004 | Drury |
| 2004/0111189 A1 | 6/2004 | Miyazawa |
| 2004/0117638 A1 | 6/2004 | Monroe |
| 2004/0135979 A1 | 7/2004 | Hazelton |
| 2004/0138794 A1 | 7/2004 | Saito |
| 2004/0145457 A1 | 7/2004 | Schofield |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |
| 2004/0181326 A1 | 9/2004 | Adams |
| 2004/0184548 A1 | 9/2004 | Kerbiriou |
| 2004/0203903 A1 | 10/2004 | Wilson |
| 2004/0209594 A1 | 10/2004 | Naboulsi |
| 2004/0210353 A1 | 10/2004 | Rice |
| 2004/0230345 A1 | 11/2004 | Tzamaloukas |
| 2004/0230370 A1 | 11/2004 | Tzamaloukas |
| 2004/0230373 A1 | 11/2004 | Tzamaloukas |
| 2004/0230374 A1 | 11/2004 | Tzamaloukas |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |

(56) References Cited

U.S. PATENT DOCUMENTS

| | | |
|---|---|---|
| 2004/0243668 A1 | 12/2004 | Harjanto |
| 2004/0254689 A1 | 12/2004 | Blazic |
| 2004/0254698 A1 | 12/2004 | Hubbard |
| 2004/0267419 A1 | 12/2004 | Jeng |
| 2005/0021199 A1 | 1/2005 | Zimmerman |
| 2005/0043869 A1 | 2/2005 | Funkhouser |
| 2005/0060070 A1 | 3/2005 | Kapolka |
| 2005/0060071 A1 | 3/2005 | Winner |
| 2005/0065682 A1 | 3/2005 | Kapadia |
| 2005/0065716 A1 | 3/2005 | Timko |
| 2005/0073585 A1 | 4/2005 | Ettinger |
| 2005/0078423 A1 | 4/2005 | Kim |
| 2005/0088291 A1 | 4/2005 | Blanco |
| 2005/0099498 A1 | 5/2005 | Lao |
| 2005/0100329 A1 | 5/2005 | Lao |
| 2005/0102074 A1 | 5/2005 | Kolls |
| 2005/0125117 A1 | 6/2005 | Breed |
| 2005/0131585 A1 | 6/2005 | Luskin |
| 2005/0131595 A1 | 6/2005 | Luskin |
| 2005/0131597 A1 | 6/2005 | Raz |
| 2005/0136949 A1 | 6/2005 | Barnes |
| 2005/0137757 A1 | 6/2005 | Phelan |
| 2005/0137796 A1 | 6/2005 | Gumpinger |
| 2005/0146458 A1 | 7/2005 | Carmichael |
| 2005/0149238 A1 | 7/2005 | Stefani |
| 2005/0149259 A1 | 7/2005 | Cherveny |
| 2005/0152353 A1 | 7/2005 | Couturier |
| 2005/0159964 A1 | 7/2005 | Sonnenrein |
| 2005/0166258 A1 | 7/2005 | Vasilevsky |
| 2005/0168258 A1 | 8/2005 | Poskatcheev |
| 2005/0171692 A1 | 8/2005 | Hamblen |
| 2005/0174217 A1 | 8/2005 | Basir |
| 2005/0182538 A1 | 8/2005 | Phelan |
| 2005/0182824 A1 | 8/2005 | Cotte |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Hoist |
| 2005/0200714 A1 | 9/2005 | Marchese |
| 2005/0203683 A1 | 9/2005 | Olsen |
| 2005/0206741 A1 | 9/2005 | Raber |
| 2005/0209776 A1 | 9/2005 | Ogino |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1 | 10/2005 | Okajima |
| 2005/0251304 A1 | 11/2005 | Cancellara |
| 2005/0256681 A1 | 11/2005 | Brinton |
| 2005/0258942 A1 | 11/2005 | Manasseh |
| 2005/0264691 A1 | 12/2005 | Endo |
| 2005/0283284 A1 | 12/2005 | Grenier |
| 2006/0001671 A1 | 1/2006 | Kamijo |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0030986 A1 | 2/2006 | Peng |
| 2006/0040239 A1 | 2/2006 | Cummins |
| 2006/0047380 A1 | 3/2006 | Welch |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0082438 A1 | 4/2006 | Bazakos |
| 2006/0092043 A1 | 5/2006 | Lagassey |
| 2006/0095175 A1 | 5/2006 | deWaal |
| 2006/0095199 A1 | 5/2006 | Lagassey |
| 2006/0095349 A1 | 5/2006 | Morgan |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0129578 A1 | 6/2006 | Kim |
| 2006/0142913 A1 | 6/2006 | Coffee |
| 2006/0143435 A1 | 6/2006 | Kwon |
| 2006/0147187 A1 | 7/2006 | Takemoto |
| 2006/0161960 A1 | 7/2006 | Benoit |
| 2006/0168271 A1 | 7/2006 | Pabari |
| 2006/0178793 A1 | 8/2006 | Hecklinger |
| 2006/0180647 A1 | 8/2006 | Hansen |
| 2006/0184295 A1 | 8/2006 | Hawkins |
| 2006/0192658 A1 | 8/2006 | Yamamura |
| 2006/0200008 A1 | 9/2006 | Moore-Ede |
| 2006/0200305 A1 | 9/2006 | Sheha |
| 2006/0204059 A1 | 9/2006 | Ido |
| 2006/0209090 A1 | 9/2006 | Kelly |
| 2006/0209840 A1 | 9/2006 | Paatela |
| 2006/0212195 A1 | 9/2006 | Veith |
| 2006/0215884 A1 | 9/2006 | Ota |
| 2006/0226344 A1 | 10/2006 | Werth |
| 2006/0229780 A1 | 10/2006 | Underdahl |
| 2006/0242680 A1 | 10/2006 | Johnson |
| 2006/0247833 A1 | 11/2006 | Malhotra |
| 2006/0253307 A1 | 11/2006 | Warren |
| 2006/0259218 A1 | 11/2006 | Wu |
| 2006/0261931 A1 | 11/2006 | Cheng |
| 2007/0001831 A1 | 1/2007 | Raz |
| 2007/0005404 A1 | 1/2007 | Raz |
| 2007/0027583 A1 | 2/2007 | Tamir |
| 2007/0027726 A1 | 2/2007 | Warren |
| 2007/0035632 A1 | 2/2007 | Silvernail |
| 2007/0043487 A1 | 2/2007 | Krzystofczyk |
| 2007/0100509 A1 | 5/2007 | Piekarz |
| 2007/0120948 A1 | 5/2007 | Fujioka |
| 2007/0124332 A1 | 5/2007 | Ballesty |
| 2007/0127833 A1 | 6/2007 | Singh |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0142986 A1 | 6/2007 | Alaous |
| 2007/0143499 A1 | 6/2007 | Chang |
| 2007/0150138 A1 | 6/2007 | Plante |
| 2007/0150140 A1 | 6/2007 | Seymour |
| 2007/0173994 A1 | 7/2007 | Kubo |
| 2007/0179691 A1 | 8/2007 | Grenn |
| 2007/0183635 A1 | 8/2007 | Weidhaas |
| 2007/0208494 A1 | 9/2007 | Chapman |
| 2007/0213920 A1 | 9/2007 | Igarashi |
| 2007/0216521 A1 | 9/2007 | Guensler |
| 2007/0217670 A1 | 9/2007 | Bar-Am |
| 2007/0219685 A1 | 9/2007 | Plante |
| 2007/0219686 A1 | 9/2007 | Plante |
| 2007/0236474 A1 | 10/2007 | Ramstein |
| 2007/0241874 A1 | 10/2007 | Okpysh |
| 2007/0244614 A1 | 10/2007 | Nathanson |
| 2007/0253307 A1 | 11/2007 | Mashimo |
| 2007/0257781 A1 | 11/2007 | Denson |
| 2007/0257782 A1 | 11/2007 | Etcheson |
| 2007/0257804 A1 | 11/2007 | Gunderson |
| 2007/0257815 A1 | 11/2007 | Gunderson |
| 2007/0260677 A1 | 11/2007 | DeMarco |
| 2007/0262855 A1 | 11/2007 | Zuta |
| 2007/0263984 A1 | 11/2007 | Sterner |
| 2007/0268158 A1 | 11/2007 | Gunderson |
| 2007/0271105 A1 | 11/2007 | Gunderson |
| 2007/0273480 A1 | 11/2007 | Burkman |
| 2007/0279214 A1 | 12/2007 | Buehler |
| 2007/0280677 A1 | 12/2007 | Drake |
| 2007/0299612 A1 | 12/2007 | Kimura |
| 2008/0035108 A1 | 2/2008 | Ancimer |
| 2008/0059019 A1 | 3/2008 | Delia |
| 2008/0071827 A1 | 3/2008 | Hengel |
| 2008/0111666 A1 | 5/2008 | Plante |
| 2008/0122603 A1 | 5/2008 | Plante |
| 2008/0137912 A1 | 6/2008 | Kim |
| 2008/0143834 A1 | 6/2008 | Comeau |
| 2008/0147267 A1 | 6/2008 | Plante |
| 2008/0157510 A1 | 7/2008 | Breed |
| 2008/0167775 A1 | 7/2008 | Kuttenberger |
| 2008/0169914 A1 | 7/2008 | Albertson |

(56) References Cited

U.S. PATENT DOCUMENTS

| | | |
|---|---|---|
| 2008/0177436 A1 | 7/2008 | Fortson |
| 2008/0195261 A1 | 8/2008 | Breed |
| 2008/0204556 A1 | 8/2008 | de Miranda |
| 2008/0211779 A1 | 9/2008 | Pryor |
| 2008/0234920 A1 | 9/2008 | Nurminen |
| 2008/0243389 A1 | 10/2008 | Inoue |
| 2008/0252412 A1 | 10/2008 | Larsson |
| 2008/0252485 A1 | 10/2008 | Lagassey |
| 2008/0252487 A1 | 10/2008 | McClellan |
| 2008/0269978 A1 | 10/2008 | Shirole |
| 2008/0281485 A1 | 11/2008 | Plante |
| 2008/0309762 A1 | 12/2008 | Howard |
| 2008/0319604 A1 | 12/2008 | Follmer |
| 2009/0009321 A1 | 1/2009 | McClellan |
| 2009/0043500 A1 | 2/2009 | Satoh |
| 2009/0043971 A1 | 2/2009 | Kim |
| 2009/0051510 A1 | 2/2009 | Follmer |
| 2009/0138191 A1 | 5/2009 | Engelhard |
| 2009/0157255 A1 | 6/2009 | Plante |
| 2009/0216775 A1 | 8/2009 | Ratliff |
| 2009/0224869 A1 | 9/2009 | Baker |
| 2009/0290848 A1 | 11/2009 | Brown |
| 2009/0299622 A1 | 12/2009 | Denaro |
| 2009/0312998 A1 | 12/2009 | Berckmans |
| 2009/0326796 A1 | 12/2009 | Prokhorov |
| 2009/0327856 A1 | 12/2009 | Mouilleseaux |
| 2010/0030423 A1 | 2/2010 | Nathanson |
| 2010/0045451 A1 | 2/2010 | Periwal |
| 2010/0047756 A1 | 2/2010 | Schneider |
| 2010/0049516 A1 | 2/2010 | Talwar |
| 2010/0054709 A1 | 3/2010 | Misawa |
| 2010/0057342 A1 | 3/2010 | Muramatsu |
| 2010/0063672 A1 | 3/2010 | Anderson |
| 2010/0063680 A1 | 3/2010 | Tolstedt |
| 2010/0063850 A1 | 3/2010 | Daniel |
| 2010/0070175 A1 | 3/2010 | Soulchin |
| 2010/0076621 A1 | 3/2010 | Kubotani |
| 2010/0085193 A1 | 4/2010 | Boss |
| 2010/0085430 A1 | 4/2010 | Kreiner |
| 2010/0087984 A1 | 4/2010 | Joseph |
| 2010/0100315 A1 | 4/2010 | Davidson |
| 2010/0103165 A1 | 4/2010 | Lee |
| 2010/0104199 A1 | 4/2010 | Zhang |
| 2010/0149418 A1 | 6/2010 | Freed |
| 2010/0153146 A1 | 6/2010 | Angell |
| 2010/0157061 A1 | 6/2010 | Katsman |
| 2010/0191411 A1 | 7/2010 | Cook |
| 2010/0201875 A1 | 8/2010 | Rood |
| 2010/0220892 A1 | 9/2010 | Kawakubo |
| 2010/0250020 A1 | 9/2010 | Lee |
| 2010/0250022 A1 | 9/2010 | Hines |
| 2010/0250060 A1 | 9/2010 | Maeda |
| 2010/0250116 A1 | 9/2010 | Yamaguchi |
| 2010/0253918 A1 | 10/2010 | Seder |
| 2010/0268415 A1 | 10/2010 | Ishikawa |
| 2010/0283633 A1 | 11/2010 | Becker |
| 2010/0312464 A1 | 12/2010 | Fitzgerald |
| 2011/0035139 A1 | 2/2011 | Konlditslotis |
| 2011/0043624 A1 | 2/2011 | Haug |
| 2011/0060496 A1 | 3/2011 | Nielsen |
| 2011/0077028 A1 | 3/2011 | Wilkes |
| 2011/0091079 A1 | 4/2011 | Yu-Song |
| 2011/0093159 A1 | 4/2011 | Boling |
| 2011/0112995 A1 | 5/2011 | Chang |
| 2011/0121960 A1 | 5/2011 | Tsai |
| 2011/0125365 A1 | 5/2011 | Larschan |
| 2011/0130916 A1 | 6/2011 | Mayer |
| 2011/0140884 A1 | 6/2011 | Santiago |
| 2011/0145042 A1 | 6/2011 | Green |
| 2011/0153367 A1 | 6/2011 | Amigo |
| 2011/0161116 A1 | 6/2011 | Peak |
| 2011/0166773 A1 | 7/2011 | Raz |
| 2011/0172864 A1 | 7/2011 | Syed |
| 2011/0173015 A1 | 7/2011 | Chapman |
| 2011/0208428 A1 | 8/2011 | Matsubara |
| 2011/0212717 A1 | 9/2011 | Rhoads |
| 2011/0213628 A1 | 9/2011 | Peak |
| 2011/0224891 A1 | 9/2011 | Iwuchukwu |
| 2011/0251752 A1 | 10/2011 | DeLarocheliere |
| 2011/0251782 A1 | 10/2011 | Perkins |
| 2011/0254676 A1 | 10/2011 | Marumoto |
| 2011/0257882 A1 | 10/2011 | McBurney |
| 2011/0273568 A1 | 11/2011 | Lagassey |
| 2011/0282542 A9 | 11/2011 | Nielsen |
| 2011/0283223 A1 | 11/2011 | Vaittinen |
| 2011/0304446 A1 | 12/2011 | Basson |
| 2012/0021386 A1 | 1/2012 | Anderson |
| 2012/0035788 A1 | 2/2012 | Trepagnier |
| 2012/0041675 A1 | 2/2012 | Juliver |
| 2012/0046803 A1 | 2/2012 | Inou |
| 2012/0071140 A1 | 3/2012 | Oesterling |
| 2012/0078063 A1 | 3/2012 | Moore-Ede |
| 2012/0081567 A1 | 4/2012 | Cote |
| 2012/0100509 A1 | 4/2012 | Gunderson |
| 2012/0109447 A1 | 5/2012 | Yousefi |
| 2012/0123806 A1 | 5/2012 | Schumann |
| 2012/0134547 A1 | 5/2012 | Jung |
| 2012/0150436 A1 | 6/2012 | Rossano |
| 2012/0176234 A1 | 7/2012 | Taneyhill |
| 2012/0190001 A1 | 7/2012 | Knight |
| 2012/0198317 A1 | 8/2012 | Eppolito |
| 2012/0203402 A1 | 8/2012 | Jape |
| 2012/0210252 A1 | 8/2012 | Fedoseyeva |
| 2012/0269383 A1 | 10/2012 | Bobbitt |
| 2012/0277950 A1 | 11/2012 | Plante |
| 2012/0280835 A1 | 11/2012 | Raz |
| 2012/0283895 A1 | 11/2012 | Noda |
| 2012/0330528 A1 | 12/2012 | Schwindt |
| 2013/0004138 A1 | 1/2013 | Kilar |
| 2013/0006469 A1 | 1/2013 | Green |
| 2013/0018534 A1 | 1/2013 | Hilleary |
| 2013/0021148 A1 | 1/2013 | Cook |
| 2013/0028320 A1 | 1/2013 | Gardner |
| 2013/0030660 A1 | 1/2013 | Fujimoto |
| 2013/0048795 A1 | 2/2013 | Cross |
| 2013/0073112 A1 | 3/2013 | Phelan |
| 2013/0073114 A1 | 3/2013 | Nemat-Nasser |
| 2013/0096731 A1 | 4/2013 | Tamari |
| 2013/0127980 A1 | 5/2013 | Haddick |
| 2013/0145269 A1 | 6/2013 | Latulipe |
| 2013/0151980 A1 | 6/2013 | Lee |
| 2013/0170762 A1 | 7/2013 | Marti |
| 2013/0197774 A1 | 8/2013 | Denson |
| 2013/0209968 A1 | 8/2013 | Miller |
| 2013/0274950 A1 | 10/2013 | Richardson |
| 2013/0278631 A1 | 10/2013 | Border |
| 2013/0317711 A1 | 11/2013 | Plante |
| 2013/0332004 A1* | 12/2013 | Gompert ............... G07C 5/008 701/1 |
| 2013/0345927 A1 | 12/2013 | Cook |
| 2013/0345929 A1 | 12/2013 | Bowden |
| 2014/0025225 A1 | 1/2014 | Armitage |
| 2014/0025254 A1 | 1/2014 | Plante |
| 2014/0032062 A1 | 1/2014 | Baer |
| 2014/0046550 A1 | 2/2014 | Palmer |
| 2014/0047371 A1 | 2/2014 | Palmer |
| 2014/0058583 A1 | 2/2014 | Kesavan |
| 2014/0089504 A1 | 3/2014 | Scholz |
| 2014/0094992 A1 | 4/2014 | Lambert |
| 2014/0098228 A1 | 4/2014 | Plante |
| 2014/0152828 A1 | 6/2014 | Plante |
| 2014/0226010 A1* | 8/2014 | Molin .................... G06Q 10/06 348/148 |
| 2014/0232863 A1 | 8/2014 | Paliga |
| 2014/0279707 A1 | 9/2014 | Joshua |
| 2014/0280204 A1 | 9/2014 | Avery |
| 2014/0300739 A1 | 10/2014 | Mimar |
| 2014/0309849 A1 | 10/2014 | Ricci |
| 2014/0335902 A1 | 11/2014 | Guba |
| 2014/0336916 A1 | 11/2014 | Yun |
| 2014/0339374 A1 | 11/2014 | Mian |
| 2015/0000415 A1 | 1/2015 | Kelley |
| 2015/0035665 A1 | 2/2015 | Plante |
| 2015/0057836 A1 | 2/2015 | Plante |

(56) References Cited

U.S. PATENT DOCUMENTS

| | | |
|---|---|---|
| 2015/0105934 A1 | 4/2015 | Palmer |
| 2015/0112542 A1 | 4/2015 | Fuglewicz |
| 2015/0112545 A1 | 4/2015 | Binion |
| 2015/0134226 A1 | 5/2015 | Palmer |
| 2015/0135240 A1 | 5/2015 | Shibuya |
| 2015/0156174 A1 | 6/2015 | Fahey |
| 2015/0189042 A1 | 7/2015 | Sun |
| 2015/0203116 A1 | 7/2015 | Fairgrieve |
| 2015/0022449 A1 | 8/2015 | Salinger |
| 2015/0222449 A1 | 8/2015 | Salinger |
| 2015/0317846 A1 | 11/2015 | Plante |
| 2015/0371462 A1 | 12/2015 | Ramesh |
| 2016/0054733 A1 | 2/2016 | Hollida |

FOREIGN PATENT DOCUMENTS

| | | |
|---|---|---|
| CA | 2692415 | 8/2011 |
| CA | 2692415 A1 | 8/2011 |
| DE | 4416991 A1 | 11/1995 |
| DE | 20311262 | 9/2003 |
| DE | 202005008238 | 8/2005 |
| DE | 102004004669 | 12/2005 |
| DE | 102004004669 A1 | 12/2005 |
| EP | 0708427 A2 | 4/1996 |
| EP | 0840270 A2 | 5/1998 |
| EP | 0848270 A2 | 6/1998 |
| EP | 1170697 A2 | 1/2002 |
| EP | 1324274 A2 | 7/2003 |
| EP | 1355278 A1 | 10/2003 |
| EP | 1427165 A2 | 6/2004 |
| EP | 1818873 A1 | 8/2007 |
| EP | 2104075 | 9/2009 |
| EP | 2320387 | 5/2011 |
| EP | 2407943 | 1/2012 |
| GB | 2268608 A | 1/1994 |
| GB | 2402530 | 12/2004 |
| GB | 2402530 A | 12/2004 |
| GB | 244694 | 8/2008 |
| GB | 2451485 | 2/2009 |
| GB | 2447184 B | 6/2011 |
| JP | 58085110 | 5/1983 |
| JP | S5885110 A | 5/1983 |
| JP | 62091092 | 4/1987 |
| JP | S6291092 A | 4/1987 |
| JP | S62166135 A | 7/1987 |
| JP | 02056197 | 2/1990 |
| JP | H0256197 A | 2/1990 |
| JP | H04257189 A | 9/1992 |
| JP | H05137144 A | 6/1993 |
| JP | H08124069 A | 5/1996 |
| JP | H09163357 A | 6/1997 |
| JP | H09272399 A | 10/1997 |
| JP | 10076880 | 3/1998 |
| JP | H1076880 A | 3/1998 |
| JP | 2002191017 | 7/2002 |
| JP | 2002191017 A | 7/2002 |
| JP | 5294188 | 9/2013 |
| KR | 1000588169 | 6/2006 |
| WO | 8809023 A1 | 11/1988 |
| WO | 9005076 | 5/1990 |
| WO | 9427844 | 12/1994 |
| WO | 9600957 A1 | 1/1996 |
| WO | 9701246 | 1/1997 |
| WO | 9726750 A1 | 7/1997 |
| WO | 9937503 | 7/1999 |
| WO | 9940545 A1 | 8/1999 |
| WO | 9962741 | 12/1999 |
| WO | 0007150 A1 | 2/2000 |
| WO | 0048033 | 2/2000 |
| WO | 0077620 | 2/2000 |
| WO | 0028410 A1 | 5/2000 |
| WO | 0123214 | 4/2001 |
| WO | 0125054 | 4/2001 |
| WO | 0146710 A2 | 6/2001 |
| WO | 03045514 | 6/2003 |
| WO | 2005095175 A1 | 10/2005 |
| WO | 2006022824 | 3/2006 |
| WO | 2006022824 A2 | 3/2006 |
| WO | 2007067767 | 1/2007 |
| WO | 2007109091 | 9/2007 |
| WO | 2009081234 | 7/2009 |
| WO | 2011055743 A1 | 5/2011 |
| WO | 2013072939 | 5/2013 |
| WO | 2013159853 | 10/2013 |

OTHER PUBLICATIONS

Written Opinion issued in PCT/US07/68328 dated Oct. 15, 2007. (3 pgs.).
Written Opinion of the International Searching Authority for PCT/US2006/47042. dated Feb. 25, 2008 (5 pages).
Written Opinion of the International Searching Authority for PCT/US2006/47055, dated Mar. 20, 2008 (5 pages).
"DriveCam, Inc's Disclosure of Proposed Constructions and Extrinsic Evidence Pursuant to Patent L.R. 4.1.a & 4.1.b" Disclosure and Extrinsic Evidence in *DriveCam, Inc.* v. *SmartDrive Systems, Inc.*, Case No. 3:11-CV-00997-H-RBB, for the Southern District of California. Nov. 8, 2011, 68 pages.
"DriveCam Driving Feedback System", DriveCam brochure, Jun. 12, 2001, Document #6600128, 2 pages.
"DriveCam Driving Feedback System" DriveCam brochure, Mar. 15, 2004, 4 pages.
"DriveCam Passenger Transportation Module", DriveCam brochure, Oct. 26, 2001, 2 pages.
"DriveCam Video Event Data Recorder", DriveCam brochure, Nov. 6, 2002, Document #6600127, 2 pages.
"Responsive Claim Construction and Identification of Extrinsic Evidence of Defendani/Counterclaimant SmartDrive Systems, Inc." Claim Construction and and Extrinsic Evidence in *DriveCam, Inc.* v. *SmartDrive Systems, Inc.*, Case No. 3:11-CV-00997-H (RBB), for the Southern District of California. Nov. 15, 2011, 20 pages.
"Sonic MyDVD 4.0: Tutorial: Trimming video segments". Tutorial for software bundled with Adaptec VideoOh! DVD USB 2.0 Edition, 2003, 13 pages.
"User's Manual for DriveCam Video Systems' HindSight 20/20 Software Version 4.0" DriveCam Manual, San Diego, 2003, Document #6600141-1, 54 pages.
Canadian Office Action issued in Application No. 2,632,685 dated Jan. 30, 2015; 5 pages.
Dan Maher, "DriveCam Taking Risk Out of Driving", DriveCam brochure folder, Jun. 6, 2005, 6 pages.
Del Lisk, "DriveCam Training Seminar" Handout, 2004, 16 pages.
European Examination Report issued in EP 07772812.9 on Jan. 22, 2015; 5 pages.
Jean (DriveCam vendor) "DriveCam Driving Feedback System", DriveCam brochure, Nov. 6, 2002, Document #6600128-1, 2 pages.
Notice of Allowance Application for U.S. Appl. No. 11/566,424, dated Feb. 26, 2010, 6 pages.
Notice of Allowance for U.S. Appl. No. 11/377,164, dated Dec. 3, 2014, 5 pages.
Notice of Allowance for U.S. Appl. No. 11/377,164, dated Feb. 13, 2015, 2 pages.
Notice of Allowance for U.S. Appl. No. 11/377,164, dated Feb. 25, 2014, 2 pages.
Notice of Allowance for U.S. Appl. No. 11/377,164, dated Nov. 18, 2013, 7 pages.
Notice of Allowance for U.S. Appl. No. 11/377,167, dated Apr. 1, 2015, 7 pages.
Notice of Allowance for U.S. Appl. No. 11/800,876, dated Apr. 19, 2012, 8 pages.
Notice of Allowance for U.S. Appl. No. 13/957,810, dated Jun. 8, 2015, 10 pages.
USPTO Final Office Action for U.S. Appl. No. 11/296,906, dated Aug. 8, 2012, 15 pages.
USPTO Final Office Action for U.S. Appl. No. 12/096,591, dated Dec. 5, 2014, 23 pages.
USPTO Final Office Action for U.S. Appl. No. 12/096,591, dated Jul. 18, 2012, 15 pages.

(56) References Cited

OTHER PUBLICATIONS

USPTO Final Office Action for U.S. Appl. No. 12/096,591, dated Nov. 7, 2013, 14 pages.
USPTO Final Office Action for U.S. Appl. No. 13/957,810, dated Jun. 27, 2014, 22 pages.
USPTO Final Office Action for U.S. Appl. No. 14/036,299, dated Feb. 24, 2015, 9 pages.
USPTO Non-Final Office Action for U.S. Appl. No. 11/296,906, dated Apr. 8, 2014, 19 pages.
USPTO Non-Final Office Action for U.S. Appl. No. 11/296,906, dated Jun. 12, 2012, 13 pages.
USPTO Non-Final Office Action for 11/377,164, dated Apr. 7, 2014, 7 pages.
USPTO Non-Final Office Action for U.S. Appl. No. 11/377,164, dated Aug. 18, 2014, 5 pages.
USPTO Non-Final Office Action for U.S. Appl. No. 11/377,164, dated Sep. 10, 2012, 10 pages.
USPTO Non-Final Office Action for U.S. Appl. No. 11/377,167, dated Jun. 27, 2013, 11 pages.
USPTO Non-Final Office Action for U.S. Appl. No. 12/096,591, dated Jun. 14, 2011, 8 pages.
USPTO Non-Final Office Action for U.S. Appl. No. 12/096,591, dated Mar. 27, 2013, 16 pages.
USPTO Non-Final Office Action for U.S. Appl. No. 13/957,810, dated Apr. 17, 2015, 6 pages.
USPTO Non-final Office Action for U.S. Appl. No. 13/957,810, dated Nov. 27, 2013, 18 pages.
Inovate Motorsports, OT-1 16 Channel OBD-II Interface User Manual, Version 1.0, Nov. 28, 2007, pp. 3, 4, 21 and 27.
PCT International Search Report and Written Opinion for PCT/US15/60721 dated Feb. 26, 2016, 11 pages.
Trivinci Systems, LLC, "Race-Keeper System User Guide", V1 .1.02, Jan. 2011, p. 21.
USPTO Non-Final Office Action dated Jan. 4, 2016 in U.S. Appl. No. 14/529,134, filed Oct. 30, 2014 (65 pgs).
PCT International Search Report and Written Opinion for PCT/IB16/51863, dated Sep. 16, 2016 (18 pgs.).
PCT International Search Report and Written Opinion for PCT/US2016/012757 dated Mar. 18, 2016 (11 pgs.).
Edwin Olson, A Passive Solution to the Sensor Synchronization Problem, the 2010 IEEE/RSJ International Conference on Intelligent Robots and Systems, Oct. 18-22, 2010, 6 pages.
Adaptec published and sold its Video0h! DVD software USB 2.0 Edition in at least Jan. 24, 2003. (1 pg.).
Ambulance Companies Use Video Technology to Improve Driving Behavior, Ambulance Industry Journal, Spring 2003 (2 pgs.).
Amended Complaint for Patent Infringement, Trade Secret Misappropriation, Unfair Competition and Conversion in *DriveCam, Inc.*v. *SmartDrive Systems, Inc.*, Case No. 3:11-CV-00997-H-RBB, for the Southern District of California, Document 34, filed Oct. 20, 2011, pp. 1-15.
Amendment filed Dec. 23, 2009 during prosecution of U.S. Appl. No. 11/566,424 (13 pgs.).
Answer to Amended Complaint; Counterclaims; and Demand for Jury Trial in *DriveCam, Inc.*v. *SmartDrive Systems, Inc.*, Case No. 3:11-CV-00997 H (RBB), for the Southern District of California, Document 47, filed Dec. 13, 2011, pp. 1-15.
U.S. Appl. No. 11/296,906, filed Dec. 8, 2005, File History (279 pgs.).
U.S. Appl. No. 11/297,669, filed Dec. 8, 2005, File History (183 pgs.).
U.S. Appl. No. 11/297,889, filed Dec. 8, 2005, File History (77 pgs.).
U.S. Appl. No. 11/298,069, filed Dec. 9, 2005, File History (105 pgs.).
U.S. Appl. No. 11/299,028, filed Dec. 9, 2005, File History (181 pgs.).
U.S. Appl. No. 11/593,659, filed Nov. 7, 2006, File History (296 pgs.).
U.S. Appl. No. 11/593,682, filed Nov. 7, 2006, File History (173 pgs.).
U.S. Appl. No. 11/593,882, filed Nov. 7, 2006, File History (94 pgs.).
U.S. Appl. No. 11/595,015, filed Nov. 9, 2006, File History (171 pgs.).
U.S. Appl. No. 11/637,754, filed Dec. 13, 2006, File History (241 pgs.).
U.S. Appl. No. 11/637,755, filed Dec. 13, 2006, File History (171 pgs.).
Bill, 'DriveCam-FAQ', Dec. 12, 2003 (3 pgs.).
Bill Siuru, 'DriveCam Could Save You Big Bucks', Land Line Magazine, May-Jun. 2000 (1 pg.).
Chris Woodyard, 'Shuttles save with DriveCam', Dec. 9, 2003 (1 pg.).
Dan Carr, Flash Video Template: Video Presentation with Navigation, Jan. 16, 2006, http://www.adobe.com/devnet/flash/articles/vidtemplate_mediapreso_flash8.html (13 pgs.).
David Cullen, 'Getting a real eyeful', Fleet Owner Magazine, Feb. 2002 (1 pg.).
David Maher, 'DriveCam Brochure Folder', Jun. 6, 2005 (2 pg.).
David Maher, "DriveCam Brochure Folder", Jun. 8, 2005 (2 pg.).
David Vogeleer et al., Macromedia Flash Professional 8UNLEASHED (Sams Oct. 12, 2005). (4 pgs.).
Del Lisk, 'DriveCam Training Handout Ver4', Feb. 3, 2005 (16 pgs.).
Drivecam, Inc., User's Manual for Drivecam Video Systems' Hindsight 20/20 Software Version 4.0 (2003). (54 pgs.).
DriveCam, Inc.'s Infringement Contentions Exhibit A, U.S. Pat. No. 6,389,340, Document 34.1, Oct. 20, 2011. (10 pgs.).
DriveCam, Inc.'s Infringement Contentions Exhibit B, U.S. Pat. No. 7,659,827. Aug. 19, 2011. (29 pgs.).
DriveCam, Inc.'s Infringement Contentions Exhibit B, U.S. Pat. No. 7,804,426, Document 34.2, Oct. 20, 2011. (20 pg.)
DriveCam, Inc.'s Infringement Contentions Exhibit C, U.S. Pat. No. 7,659,827, Document 34.3, Oct. 20, 2011. (17 pgs.).
DriveCam, Inc.'s Infringement Contentions Exhibit C, U.S. Pat. No. 7,804,426. Aug. 19, 2011. (47 pgs.).
DriveCam, Inc.'s Infringement Contentions Exhibit D, Document 34.4, Oct. 20, 2011. (2 pgs.).
DriveCam--Illuminator Data Sheet, Oct. 2, 2004. (1 pg.).
Drivecam.com as retrieved by the Internet Wayback Machine as of Mar. 5, 2005(1 pg.).
DriveCam's Disclosure of Asserted Claims and Preliminary Infringement Contentions in *DriveCam, Inc.*v. *SmartDrive Systems, Inc.*, Case No. 3:11-CV-00997-H-RBB, for the Southern District of California. Aug. 19, 2011. (6 pgs.).
DriveCam Driving Feedback System, Mar. 15, 2004 (12 pgs.).
DriveCam Extrinsic Evidence with Patent LR 4.1 .A Disclosures, Nov. 3, 2011. (1 pg.).
DriveCam Extrinsic Evidence with Patent LR 4.1 .a Disclosures, Nov. 8, 2011. (1 pg.).
Driver Feedback System, Jun. 12, 2001 (1 pg.).
First Amended Answer to Amended Complaint and First Amended Counterclaims; and Demand for Jury Trial in *DriveCam, Inc.*v. *SmartDrive Systems, Inc.*, Case No. 3:11-CV-00997 H (RBB), for the Southern District of California, Document 53, filed Dec. 20, 2011, pp. 1-48.
First Amended Answer to Amended Complaint and First Amended Counterclaims; and Demand for Jury Trial in *DriveCam, Inc.*v. *SmartDrive Systems, Inc.*, Case No. 3:11-CV-00997 H (RBB), for the Southern District of California, Document 55, filed Jan. 1, 2012, pp. 86-103.
First Amended Answer to Amended Complaint and First Amended Counterclaims; and Demand for Jury Trial in *DriveCam, Inc.*v. *SmartDrive Systems, Inc.*, Case No. 3:11-CV-00997 H (RBB), for the Southern District of California, Document 55, filed Jan. 3, 2012, pp. 86-103.
First Amended Answer to Amended Complaint and First Amended Counterclaims; and Demand for Jury Trial in *DriveCam, Inc.*v. *SmartDrive Systems, Inc.*, Case No. 3:11-CV-00997 H (RBB), for the Southern District of California, Exhibit A, Document 55, filed Jan. 3, 2012, pp. 49-103.

(56) References Cited

OTHER PUBLICATIONS

Franke, U., et al., Autonomous Driving Goes Downtown, IEEE Intelligent Systems, 13(6):40-48 (1988); Digital Object Identifier 10.1109/5254.736001.
Gallagher, B., et al., Wireless Communications for Vehicle Safety: Radio Link Performance and Wireless Connectivity Methods, Vehicular Technology Magazine, IEEE, 1(4):4-24 (2006); Digital Object Identifier 10.1109/MVT.2006.343641.
Gandhi, T., et al., Pedestrian Protection Systems: Issues, Survey, and Challenges, IEEE Transactions on Intelligent Transportation Systems, 8(3):413-430 (2007); Digital Object Identifier 10.1109/TITS.2007.903444.
Gary and Sophia Rayner, Final Report for Innovations Deserving Exploratory Analysis (IDEA) Intelligent Transportation Systems (ITS) Programs' Project 84, I-Witness Black Box Recorder, San Diego, CA, Nov. 2001. (19 pgs.).
GE published its VCR User's Guide for Model VG4255 in 1995. (44 pgs.).
Glenn Oster, 'Hindsight 20/20 v4.0 Software Installation', 1 of 2, Jun. 20, 2003 (2 pgs.).
Glenn Oster, 'HindSight 20/20 v4.0 Software Installation', 2 of 2, Jun. 20, 2003. (54 pgs.).
Glenn Oster, 'Illuminator Installation', Oct. 3, 2004 (2 pgs.).
Hans Fantel, Video; Search Methods Make a Difference in Picking VCR's, NY Times, Aug. 13, 1989. (1 pg.).
I/O Port Racing Supplies' website discloses using Traqmate's Data Acquisition with Video Overlay system in conjunction with professional driver coaching sessions (available at http://www.ioportracing.com/Merchant2/merchant.mvc?Screen=Ctgy &Categorys- ub.-Code=coaching)., printed from site on Jan. 11, 2012. (4 pgs.).
Inovate Motorsports, OT-1 16 Channel OBD-II Interface User Manual, Version 1.0, Nov. 28, 2007, pp. 3, 4, 21 & 27.
Interior Camera Data Sheet', Oct. 26, 2001 (2 pgs.).
International Search Report and Written Opinion issued in PCT/US07/68325 dated Feb. 27, 2008. (10 pgs.).
International Search Report and Written Opinion issued in PCT/US07/68325 dated Feb. 27, 2008. (2 pgs.).
International Search Report and Written Opinion issued in PCT/US07/68328 dated Oct. 15, 2007. (2 pgs.).
International Search Report and Written Opinion issued in PCT/US07/68329 dated Mar. 3, 2008. (10 pgs.).
International Search Report and Written Opinion issued in PCT/US07/68332 dated Mar. 3, 2008. (8 pgs.).
International Search Report and Written Opinion issued in PCT/US07/68334 dated Mar. 5, 2008. (11 pgs.).
International Search Report for PCTUS2006/47055, dated Mar. 20, 2008 (2 pages).
International Search Report issued in PCT/US2006/47042 dated Feb. 25, 2008 (3pgs.).
J. Gallagher, 'Lancer Recommends Tech Tool', Insurance and Technology Magazine, Feb. 2002 (1 pg.).
Jean (DriveCam vendor), 'DC Data Sheet', Nov. 6, 2002. (1 pg.).
Jean (DriveCam vendor), 'DriveCam brochure', Nov. 6, 2002. (4 pgs.).
Jean (DriveCam vendor), 'Feedback Data Sheet', Nov. 6, 2002. (1 pg.).
Jean (DriveCam vendor), 'Hindsight 20-20 Data Sheet', Nov. 4, 2002 (2 pg.).
Jessyca Wallace, 'Analyzing and Processing DriveCam Recorded Events', Oct. 6, 2003 (8 pgs.).
Jessyca Wallace, 'Overview of the DriveCam Program', Dec. 15, 2005 (13 pgs.).
Jessyca Wallace, 'The DriveCam Driver Feedback System', Apr. 6, 2004 (21 pgs.).
Joint Claim Construction Chart, U.S. Pat. No. 6,389,340, 'Vehicle Data Recorder' for Case No. 3:11-CV-00997-H-RBB, Document 43-1, filed Dec. 1, 2011, pp. 1-33.
Joint Claim Construction Chart in *DriveCam, Inc.*v. *SmartDrive Systems, Inc.*, Case No. 11-CV-0997-H (RBB), for the Southern District of California, Document 43, filed Dec. 1, 2011, pp. 1-2.
Joint Claim Construction Worksheet, U.S. Pat. No. 6,389,340, 'Vehicle Data Reporter' for Case No. 3:11-CV-00997-H-RBB, Document 44-1, filed Dec. 1, 2011, pp. 1-10.
Joint Claim Construction Worksheet, U.S. Pat. No. 6,389,340, "Vehicle Data Reporter" for Case No. 3:11-CV-00997-H-RBB, Document 44-1, filed Dec. 1, 2011, pp. 1-10.
Joint Claim Construction Worksheet in *DriveCam, Inc.*v. *SmartDrive Systems, Inc.*, Case No. 3:11-CV-00997 H (RBB), for the Southern District of California, Document 44, filed Dec. 1, 2011, pp. 1-2.
Joint Motion for Leave to Supplement Disclosure of Asserted Claims and Preliminary Infringement Contentions in *DriveCam, Inc.*v. *SmartDrive Systems, Inc.*, Case No. 3:11-cv-00997-H-RBB, Document 29, filed Oct. 12, 2011, pp. 1-7.
Julie Stevens, 'DriveCam Services', Nov. 15, 2004 (9 pgs.).
Julie Stevens, 'Program Support Roll-Out & Monitoring', Jul. 13, 2004 (2 pgs.).
Jung, Sang-Hack, et al., Egomotion Estimation in Monocular Infra-red Image Sequence for Night Vision Applications, IEEE Workshop on Applications of Computer Vision (WACV '07), Feb. 2007, 6 pgs.; Digital Object Identifier 10.1109/WACV.2007.20.
JVC Company of America, JVC Video Cassette Recorder HR-IP820U Instructions (1996). (44 pgs.).
Kamijo, S., et al., A Real-Time Traffic Monitoring System by Stochastic Model Combination, IEEE International Conference on Systems, Man and Cybernetics, 4:3275-3281 (2003).
Kamijo, S., et al., An Incident Detection System Based on Semantic Hierarchy, Proceedings of the 7th International IEEE Intelligent Transportation Systems Conference, Oct. 3-6, 2004, pp. 853-858; Digital Object Identifier 10.1109/ITSC.2004.1399015.
Karen, 'Downloading Options to HindSight 20120', Aug. 6, 2002. (15 pgs.).
Karen, 'Managers Guide to the DriveCam Driving Feedback System', Jul. 30, 2002 (11 pgs.).
Kathy Latus (Latus Design), 'Case Study—Cloud 9 Shuttle', Sep. 23, 2005 (1 pg.).
Kathy Latus (Latus Design), 'Case Study—Lloyd Pest Control', Jul. 19, 2005 (1 pg.).
Kathy Latus (Latus Design), 'Case Study—Time Warner Cable', Sep. 23, 2005. (1 pg.).
Ki, Yong-Kul, et al., A Traffic Accident Detection Model using Metadata Registry, Proceedings of the Fourth International Conference on Software Engineering Research, Management and Applications; Aug. 9-11, 2006 pp. 255-259 Digital Object Identifier 10.1109/Sera.2006.8 E.
Kitchin, Charles. "Understanding accelerometer scale factor and offset adjustments." Analog Devices (1995). (4 pgs.).
Lin, Chin-Teng et al., EEG-based drowsiness estimation for safety driving using independent component analysis; IEEE Transactions on Circuits and Systems-I: Regular Papers, 52(12):2726-2738 (2005); Digital Object Identifier 10.1109/TCSI.2005.857555.
Lisa Mckenna, 'A Fly on the Windshield?', Pest Control Technology Magazine, Apr. 2003 (2 pgs.).
Miller, D.P., Evaluation of Vision Systems for Teleoperated Land Vehicles. Control Systems Magazine, IEEE, 8 (3):37-41 (1988); Digital Identifier 10.1109/37.475.
Munder, S., et al., Pedestrian Detection and Tracking Using a Mixture of View-Based Shape-Texture Models, IEEE Transactions on Intelligent Transportation Systems, 9(2):333-343 (2008); Digital Identifier 10.1109/TITS.2008.922943.
Panasonic Corporation, Video Cassette Recorder (VCR) Operating Instructions for Models No. PV-V4020/PV-V4520. (40 pgs.).
Passenger Transportation Mode Brochure, May 2, 2005. (2 pgs.).
Patent Abstracts of Japan vol. 007, No. 180 (P-215), Aug. 9, 1983 (Aug. 9, 1983) JP 58 085110 A (Mitsuhisa Ichikawa), May 21, 1983 (May 21, 1983) (1 pg.).
Patent Abstracts of Japan vol. 11, No. 292 (E-543), Sep. 19, 1987 (Sep. 19, 1987) JP 62 091092 A (OK ENG:KK), Apr. 25, 1987 (Apr. 25, 1987) (1 pg.).

(56) References Cited

OTHER PUBLICATIONS

Patent Abstracts of Japan vol. 12, No. 1 (M-656), Jan. 6, 1988 (Jan. 6, 1988) JP 62 166135 A (Fuji Electric Co Ltd), Jul. 22, 1987 (Jul. 22, 1987) (1 pg.).
Patent Abstracts of Japan vol. 14, No. 222 (E-0926), May 10, 1990 (May 10, 1990) JP 02 056197 A (Sanyo Electric Co Ltd), Feb. 26, 1990 (Feb. 26, 1990) (1 pg.).
Patent Abstracts of Japan vol. 17, No. 39 (E-1311), Jan. 25, 1993 (Jan. 25, 1993) JP 04 257189 A (Sony Corp), Sep. 11, 1992 (Sep. 11, 1992) (1 pg.).
Patent Abstracts of Japan vol. 17, No. 521 (E-1435), Sep. 20, 1993 (Sep. 20, 1993) JP 05 137144 A (Kyocera Corp), Jun. 1, 1993 (Jun. 1, 1993) (7 pgs.).
Patent Abstracts of Japan vol. 1996, No. 9, Sep. 30, 1996 (Sep. 30, 1996) JP 08 124069 A (Toyota Motor Corp), May 17, 1996 (May 17, 1996) (15 pgs.).
Patent Abstracts of Japan vol. 1997, No. 10, Oct. 31, 1997 (Oct. 31, 1997) JP 09 163357 A (Nippon Soken Inc), Jun. 20, 1997 (Jun. 20, 1997) (1 pg.).
Patent Abstracts of Japan vol. 1998, No. 2, Jan. 30, 1998 (Jan. 30, 1998) JP 09 272399 A (Nippon Soken Inc), Oct. 21, 1997 (Oct. 21, 1997) (1 pg.).
Patent Abstracts of Japan vol. 1998, No. 8, Jun. 30, 1998 (Jun. 30, 1998) JP 10 076880 A (Muakami Corp), Mar. 24, 1998 (Mar. 24, 1998) (1 pg.).
PCT/US2010/022012, Invitation to Pay Additional Fees with Communication of Partial International Search, Jul. 21, 2010. (4 pgs.).
Peter G. Thurlow, Letter (including exhibits) Regarding Patent Owner's Response to Initial Office Action in Ex Parte Reexamination, Mar. 27, 2012. (78 pgs.).
Preliminary Claim Construction and Identification of Extrinsic Evidence of Defendant/Counterclaimant SmartDriveSystems, Inc.' in *DriveCam, Inc.*v. *SmartDrive Systems, Inc.*, Case No. 3:11-CV-00997-H (RBB), for the Southern District of California. Nov. 8, 2011. (13 pgs.).
Quinn Maughan, 'DriveCam Enterprise Services', Jan. 5, 2006 (2 pgs.).
Quinn Maughan, 'DriveCam Managed Services', Jan. 5, 2006. (2 pgs.).
Quinn Maughan, 'DriveCam Standard Edition', Jan. 5, 2006. (2 pgs.).
Quinn Maughan, 'DriveCam Unit Installation', Jul. 21, 2005 (9 pgs.).
Quinn Maughan, 'Enterprise Services', Apr. 17, 2006 (2 pgs.).
Quinn Maughan, 'Enterprise Services', Apr. 7, 2006 (2 pgs.).
Quinn Maughan, 'Hindsight Installation Guide', Sep. 29, 2005 (55 pgs.).
Quinn Maughan, 'Hindsight Users Guide', Jun. 7, 2005 (80 pgs.).
Ronnie Rittenberry, 'Eyes on the Road', Jul. 2004 (2 pgs.).
SmartDrives Systems, Inc's Production, SO14246-S014255, Nov. 16, 2011 (1 pg.).
Supplement to DriveCam's Disclosure of Asserted Claims and Preliminary Infringement Contentions' in *DriveCam, Inc.*v. *SmartDrive Systems, Inc.*, Case No. 3:11-CV-00997-H-RBB, for the Southern District of California. Oct. 14, 2011. (7 pgs.).
The DriveCam, Nov. 6, 2002. (2 pgs.).
The DriveCam, Nov. 8, 2002 (2 pgs.).
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012. (4 pgs.).
Trivinci Systems, LLC, Race-Keeper Systems User Guide, Jan. 2011, v1, 1.02, pp. 34 and 39.
U.S. Appl. No. 12/691,639, entitled 'Driver Risk Assessment System and Method Employing Selectively Automatic Event Scoring', filed Jan. 21, 2010. (52 pgs.).
U.S. Appl. No. 11/377,167, Final Office Action dated Nov. 8, 2013. (19 pgs.).
U.S. Appl. No. 11/377,157 filed Mar. 16, 2006 entitled, "Vehicle Event Recorder Systems and Networks Having Parallel Communications Links" (28 pgs.).
U.S. Appl. No. 11/377,167 filed Mar. 16, 2006 entitled, "Vehicle Event Recorder Systems and Networks Having Integrated Cellular Wireless Communications Systems" (29 pgs.).
USPTO Final Office Action for U.S. Appl. No. 11/297,669, dated Nov. 7, 2011, 15 pages.
USPTO Final Office Action for U.S. Appl. No. 13/957,810, dated Jun. 27, 2014, 24 pages.
USPTO Non-Final Office Action for U.S. Appl. No. 11/296,906, dated Apr. 2, 2009, 7 pages.
USPTO Non-Final Office Action for U.S. Appl. No. 11/296,906, dated Nov. 6, 2009, 9 pages.
USPTO Non-Final Office Action for U.S. Appl. No. 11/297,669, dated Apr. 28, 2011, 11 pages.
USPTO Non-Final Office Action for U.S. Appl. No. 11/299,028, dated Apr. 24, 2008, 9 pages.
USPTO Non-Final Office Action for U.S. Appl. No. 11/377,164, dated Nov. 19, 2007, 7 pages.
USPTO Non-Final Office Action for U.S. Appl. No. 11/377,164, dated Nov. 25, 2011, 9 pages.
USPTO Non-Final Office Action for U.S. Appl. No. 11/377,164, dated Sep. 11, 2008, 8 pages.
USPTO Non-Final Office Action for U.S. Appl. No. 11/377,167, dated Jun. 5, 2008, 11 pages.
USPTO Non-Final Office Action for U.S. Appl. No. 11/800,876, dated Dec. 1, 2010, 12 pages.
USPTO Non-Final Office Action for U.S. Appl. No. 11/800,876, dated Dec. 20, 2011, 8 pages.
USPTO Non-Final Office Action for U.S. Appl. No. 12/096,591, dated May 20, 2014, 19 pages.
USPTO Non-Final Office Action for U.S. Appl. No. 14/036,299, dated Aug. 12, 2014. (14 pgs.).
USPTO Non-Final Office Action for U.S. Appl. No. 11/296,907, dated Mar. 22, 2007 (17 pages).
USPTO Non-final Office Action dated Aug. 27, 2009 during prosecution of U.S. Appl. No. 11/566,424 (25 pgs.).
USPTO Non-Final Office Action dated Nov. 27, 2013 in U.S. Appl. No. 13/957,810, filed Aug. 2, 2013. (19 pgs.).
Veeraraghavan, H., et al., Computer Vision Algorithms for Intersection Monitoring, IEEE Transactions on Intelligent Transportation Systems, 4(2):78-89 (2003); Digital Object Identifier 10.1109/TITS.2003.821212.
Wijesoma, W.S., et al., Road Curb Tracking in an Urban Environment, Proceedings of the Sixth International Conference of Information Fusion, 1:261-268 (2003).

\* cited by examiner

VEHICLE EVENT RECORDERS WITH INTEGRATED WEB SERVER

BACKGROUND OF THE INVENTIONS

Field

The following inventions disclosure is generally concerned with vehicle event recorder systems and specifically concerned with vehicle event recorder systems having integrated web server modules.

Prior Art

The inventions presented in U.S. Pat. No. 6,947,817 by inventor Diem for nonintrusive diagnostic tools for testing oxygen sensor operation relates to a diagnostic system for testing a vehicle where such systems include a wireless communications link between a vehicle any remote network of server computer. In particular, a WiFi type access points allowed an analyzer to communicate by way the Internet with a server computer hosting and oxygen sensor SOAP (simple object access protocol) service. In a nutshell, the system relates to smog sensors for automobiles which communicate with remote servers by way of a WiFi communications links.

Video surveillance systems are used to provide video records of events, incidents, happenings, et cetera in locations of special interest. For example, retail banking offices are generally protected with video surveillance systems which provide video evidence in case of robbery. While video surveillance systems are generally used in fixed location scenarios, mobile video surveillance systems are also commonly used today.

In particular, video systems have been configured for use in conjunction with an automobile and especially for use with police cruiser type automobiles. As a police cruiser is frequently quite near the scene of an active crime, important image information may be captured by video cameras installed on the police cruiser. Specific activity of interest which may occur about an automobile is not always associated with crime and criminals. Sometimes events which occur in the environments immediately about an automobile are of interest for reasons having nothing to do with crime. In example, a simple traffic accident where two cars come together in a collision may be the subject of video evidence of value. Events and circumstances leading up to the collision accident may be preserved such that an accurate reconstruction can be created. This information is useful when trying come to a determination as to cause, fault and liability. As such, general use of video systems in conjunction with automobiles is quickly becoming an important tool useful for the protection of all. Some examples of the systems are illustrated below with reference to pertinent documents.

Inventor Schmidt presents in U.S. Pat. No. 5,570,127, a video recording system for a passenger vehicle, namely a school bus, which has two video cameras one for an inside bus view and one for a traffic view, a single recorder, and a system whereby the two cameras are multiplexed at appropriate times, to the recording device. A switching signal determines which of the two video cameras is in communication with the video recorder so as to view passengers on the passenger vehicle at certain times and passing traffic at other times.

Thomas Doyle of San Diego, Calif. and QUALCOMM Inc. also of San Diego, present an invention for a method and apparatus for detecting fault conditions in a vehicle data recording device to detect tampering or unauthorized access, in U.S. Pat. No. 5,586,130. The system includes vehicle sensors for monitoring one or more operational parameters of the vehicle. The fault detection technique contemplates storing a current time value at regular intervals during periods in which the recording device is provided with a source of main power. Inventor Doyle also teaches in the U.S. Pat. No. 5,815,071, a method and apparatus for monitoring parameters of vehicle electronic control units.

A "computerized vehicle log" is presented by Dan Kikinis of Saratoga Calif. in U.S. Pat. No. 5,815,093. The vehicle accident recording system employs a digital camera connected to a controller is nonvolatile memory, and an accident sensing interrupter. The oldest memory is overwritten by the newest images, until an accident is detected at which time the memory is blocked from further overwrites to protect the more vital images, which may include important information about the accident. Mr. Kikinis instructs that in preferred embodiments, the system has a communications port whereby stored images are downloaded after an accident to a digital device capable of displaying images. This feature is described in greater detail in the specification which indicates a wired download to a server having specialized image handling and processing software thereon.

Inventor Mr. Turner of Compton, Calif., no less, teaches an antitheft device for an automotive vehicle having both an audible alarm and visual monitor system. Video monitor operators are responsible for monitoring and handling an emergency situation and informing a 911 emergency station. This system is presented in U.S. Pat. No. 6,002,326.

A vehicle accident video recorder, in particular, a railroad vehicle accident video recorder, is taught by inventors Cox et al. In this system, a method and monitoring unit for recording the status of the railroad vehicle prior to a potential accident is presented. The monitoring unit continuously monitors the status of an emergency brake of the railroad vehicle and the status of a horn of the railroad vehicle. Video images are recorded and captured for a predetermined period of time after detecting that the emergency brake or horn blast has been applied as an event trigger. This invention is the subject of U.S. Pat. No. 6,088,635.

A vehicle crash data recorder is presented by inventor Ferguson of Bellaire, Ohio in U.S. Pat. No. 6,185,490. The apparatus is arranged with a three stage memory to record and retain information. And further it is equipped with a series and parallel connectors to provide instant on-scene access to accident data. It is important to note that Ferguson finds it important to include the possibility of on-site access to the data. Further, that Ferguson teaches use of a wired connection in the form of a serial or parallel hardwire connector. This teaching of Ferguson is common in many advanced systems configured as vehicle event recorders.

A traffic accident data recorder and traffic accident reproduction system and method is presented as U.S. Pat. No. 6,246,933. A plurality of sensors for registering vehicle operation parameters including at least one vehicle mounted digital video, audio camera is included for sensing storing and updating operational parameters. A rewritable, nonvolatile memory is provided for storing those processed operational parameters and video images and audio signals, which are provided by the microprocessor controller. Data is converted to a computer readable form and read by a computer such that an accident can be reconstructed via data collected.

U.S. Pat. No. 6,298,290 presented by Abe et al, teaches a memory apparatus for vehicle information data. A plurality of sensors including a CCD camera collision center of vehicle speed sensors, steering angle sensor, brake pressure sensor, acceleration sensor, are all coupled to a control unit. Further, the control unit passes information to a flash memory and a RAM memory subject to an encoder. The information collected is passed through a video output terminal. This illustrates another hardwire system and the importance placed by experts in the art on a computer hardware interface. This is partly due to the fact that video systems are typically data intensive and wired systems are necessary as they have bandwidth sufficient for transfers of large amounts of data.

Mazzilli of Bayside, N.Y. teaches in U.S. Pat. No. 6,333,759 a 360° automobile video camera system. A complex mechanical mount provides for a single camera to adjust its viewing angle giving a 360° range for video recording inside and outside of an automotive vehicle.

U.S. Pat. No. 6,389,339 granted to Inventor Just, of Alpharetta, Ga. teaches a vehicle operation monitoring system and method. Operation of a vehicle is monitored with an onboard video camera linked with a radio transceiver. A monitoring service includes a cellular telecommunications network to view a video data received from the transceiver to a home-base computer. These systems are aimed at parental monitoring of adolescent driving. The mobile modem is designed for transmitting live video information into the network as the vehicle travels.

Morgan, Hausman, Chilek, Hubenak, Kappler, Witz, and Wright with their heads together invented an advanced law enforcement and response technology in U.S. Pat. No. 6,411,874 granted Jun. 25, 2002. A central control system affords intuitive and easy control of numerous subsystems associated with a police car or other emergency vehicle. This highly integrated system provides advanced control apparatus which drives a plurality of detector systems including video and audio systems distributed about the vehicle. A primary feature included in this device includes an advanced user interface and display system, which permits high level driver interaction with the system.

Inventor Lambert teaches in U.S. Pat. No. 6,421,080 a "digital surveillance system with pre-event recording". Pre-event recording is important in accident recording systems, because detection of the accident generally happens after the accident has occurred. A first memory is used for temporary storage. Images are stored in the temporary storage continuously until a trigger is activated which indicates an accident has occurred at which time images are transferred to a more permanent memory.

Systems taught by Gary Rayner in U.S. Pat. Nos. 6,389,340; 6,405,112; 6,449,540; and 6,718,239, each directed to cameras for automobiles which capture video images, both of forward-looking and driver views, and store recorded images locally on a mass storage system. An operator, at the end of the vehicle service day, puts a wired connector into a device port and downloads information into a desktop computer system having specialized application software whereby the images and other information can be played-back and analyzed at a highly integrated user display interlace.

It is not possible in the systems Rayner teaches for an administrative operator to manipulate or otherwise handle the data captured in the vehicle at an off-site location without human intervention. It is necessary for a download operator to transfer data captured from the recorder unit device to a disconnected computer system. While proprietary 'DriveCam' files can be e-mailed or otherwise transferred through the Internet, those files are in a format with a can only be digested by desktop software running at a remote computer. It is necessary to have the DriveCam desktop application on the remote computer. In order that the files be properly read. In this way, data captured by the vehicles is totally unavailable to some parties having an interest in the data. Namely those parties who do not have access to a computer appropriately arranged with the specific DriveCam application software. A second and major disadvantage is systems presented by Rayner includes necessity that a human operator service the equipment each day in a manual download action.

Remote reporting and manipulation of automobile systems is not entirely new. The following are very important teachings relating to some automobile systems having a wireless communications link component.

Inventors Fan et al, teach inventions of methods and systems for defecting vehicle collision using global positioning system GPS. The disclosure of Jun. 12, 2001 resulted in granted patent having U.S. Pat. No. 6,459,988. A GPS receiver is combined with wireless technology to automatically report accident and third pasties remotely located. A system uses the GPS signals to determine when an acceleration value exceeds the preset threshold which is meant to be indicative of an accident having occurred.

Of particular interest include inventions presented by inventors Nagda et al., in the document numbered U.S. Pat. No. 6,862,524 entitled using location data to determine trafficking route information. In this system for determining and disseminating traffic information of route information, traffic condition information is collected from mobile units that provide their location or position information. Further route information may be utilized to determine whether a mobile unit is allowed or prohibited from traveling along a certain route.

A common assignee, @Road Inc., owns the preceding two patents in addition to the following: U.S. Pat. Nos. 6,529,159; 6,552,682; 6,594,576; 6,664,922; 6,795,017; 6,832,140; 6,867,733; 6,882,313; and 6,922,566. As such, @Road Inc., must be considered a major innovator in position technologies arts as they relate to mobile vehicles and remote server computers.

General Motors Corp. teaches in U.S. Pat. No. 6,728,612, an automated telematics test system and method. The invention provides a method and system testing a telematics system in a mobile vehicle a test command from a test center to a call center is based on a test script. The mobile vehicle is continuously in contact by way of cellular communication networks with a remotely located host computer.

Inventor Earl Diem and Delphi Technologies Inc., had granted to them on Sep. 20, 2005, U.S. Pat. No. 6,947,817. The nonintrusive diagnostic tool for sensing oxygen sensor operation include a scheme or an oxygen analyzer deployed in a mobile vehicle communicates by way of an access point to a remotely located server. A diagnostic heuristic is used to analyze the data and confirm proper operation of the sensor. Analysis may be performed by a mainframe computer quickly note from the actual oxygen sensor.

Similar patents including special relationships between mobile vehicles and remote host computers include those presented by various inventors in U.S. Pat. Nos. 6,735,503; 6,739,078; 6,760,757; 6,810,362; 6,832,141; and 6,850,823.

Another special group of inventions owned by Reynolds and Reynolds Holding Inc., is taught first by Lightner et al, in U.S. Pat. No. 6,928,348 issued Aug. 9, 2005. In these inventions, Internet based emission tests are performed on vehicles having special wireless couplings to computer networks. Data may be further transferred to entities of particular interest including the EPA or California Air Resources Board, for example, or particular insurance companies and other organizations concerned with vehicle emissions and environment.

Other patents held by Reynolds and Reynolds Holding Inc., include those relating to reporting of automobile performance parameters to remote servers via wireless links. Specifically, an onboard data bus OBD system is coupled to a microprocessor, by way of a standard electrical connector. The microprocessor periodically receives data and transmits it into the wireless communications system. This information is more fully described in U.S. patent granted Oct. 21, 2003 U.S. Pat. No. 6,636,790. Inventors Lightner et al, present method and apparatus for remotely characterizing the vehicle performance. Data at the onboard data by his periodically received by a microprocessor and passed into a local transmitter. The invention specifically calls out transmission of data on a predetermined time interval. Thus these inventions do not anticipate nor include processing and analysis steps which result in data being passed at time other than expiration of the predetermined time period.

Reynolds and Reynolds Holding Inc., further describes systems where motor vehicles are coupled by wireless communications links to remote host servers in U.S. Pat. No. 6,732,031.

While systems and inventions of the art are designed to achieve particular goals and objectives, some of those being no less than remarkable, these inventions have limitations which prevent their use in new ways now possible. Inventions of the art are not used and cannot be used to realize the advantages and objectives of the inventions taught herefollowing.

The inventions disclosure of U.S. patent application filed Dec. 9, 2005 having Ser. No. 11/299,028 is presented by this same inventor. Further, another U.S. application filed Dec. 8, 2005 having Ser. No. 11/297,669 is similarly presented by same inventor. In addition, another U.S. application filed Dec. 7, 2005, entitled: "Memory Management in Event Recording Systems" serial number unknown; this application will be amended to properly reflect the serial number as soon as it is known, is also presented by instant inventor. Each of these disclosures include material which is critically important to a full understanding of important concepts relating to vehicle event recording systems. Accordingly, these disclosures are hereby incorporated here by explicit reference.

SUMMARY OF THESE INVENTIONS

Comes now, James Plante with inventions of vehicle event recorders having integrated web servers.

Vehicle event recorders having integrated web server modules are first presented herein this disclosure. A vehicle event recorder is arranged as a video camera, microprocessor, memory among other supporting subsystems such that when a predetermined event occurs, in example a car crash or unexpected impact, a video record of the incident is preserved. In these inventions, such vehicle event recorders are further provided with an advanced interface system. A web server module is incorporated and arranged as part of the included computer system. Thus, the system and all its subsystems may be addressed via hypertext transfer protocol, http, type transactions and commands. Users can interact with vehicle event recorder units of these inventions with nothing other than any standard computer. It is no longer necessary to load, manage, and maintain, proprietary application specific software on a user's workstation computer. Rather, a user may manipulate system settings, view and transfer files, receive e-mail alerts, and otherwise completely control the device as its functionality is entirely exposed by the integrated web server and complementary computing systems.

As a consumer product, a vehicle event recorder may be installed in a family vehicle without special knowledge or skill. The device operates to collect video and other vehicle performance information while the vehicle is in normal operation. Upon connection to a computer network, or more specifically a home computer network, a simple computer workstation equipped with a web browser can address the vehicle event recorder as the web server is responsive to requests sent by the web browser.

In addition, these systems include pre-programmed 'web pages' or 'web forms'. These pages may be implemented as computer files stored in a ROM or DRAM, et cetera, of the vehicle event recorder. They are pre-programmed with interconnects and preset relationships with subsystems. For example, these pages may be provide an interface to camera settings such as brightness and contrast, et cetera.

Further, in some versions, a file transfer protocol server and simple mail transfer protocol servers are also included. These servers also support general interface mechanisms which permit standard computers to interact with these vehicle event recorders without requiring installation of special software and hardware systems.

OBJECTIVES OF THESE INVENTIONS

It is a primary object of these inventions to provide vehicle event recorders and vehicle event recorder systems.

It is an object of these inventions to provide vehicle event recorders with an improved user interface.

It is a further object to eliminate previously required workstation desktop applications and complex external communications mechanisms and protocol.

It is an object of these inventions to provide interface to vehicle event recording systems via standard computing platforms and ubiquitous software.

A better understanding can be had with reference to detailed description of preferred embodiments and with reference to appended drawings. Embodiments presented are particular ways to realize these inventions and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

GLOSSARY OF SPECIAL TERMS

Figure 1:
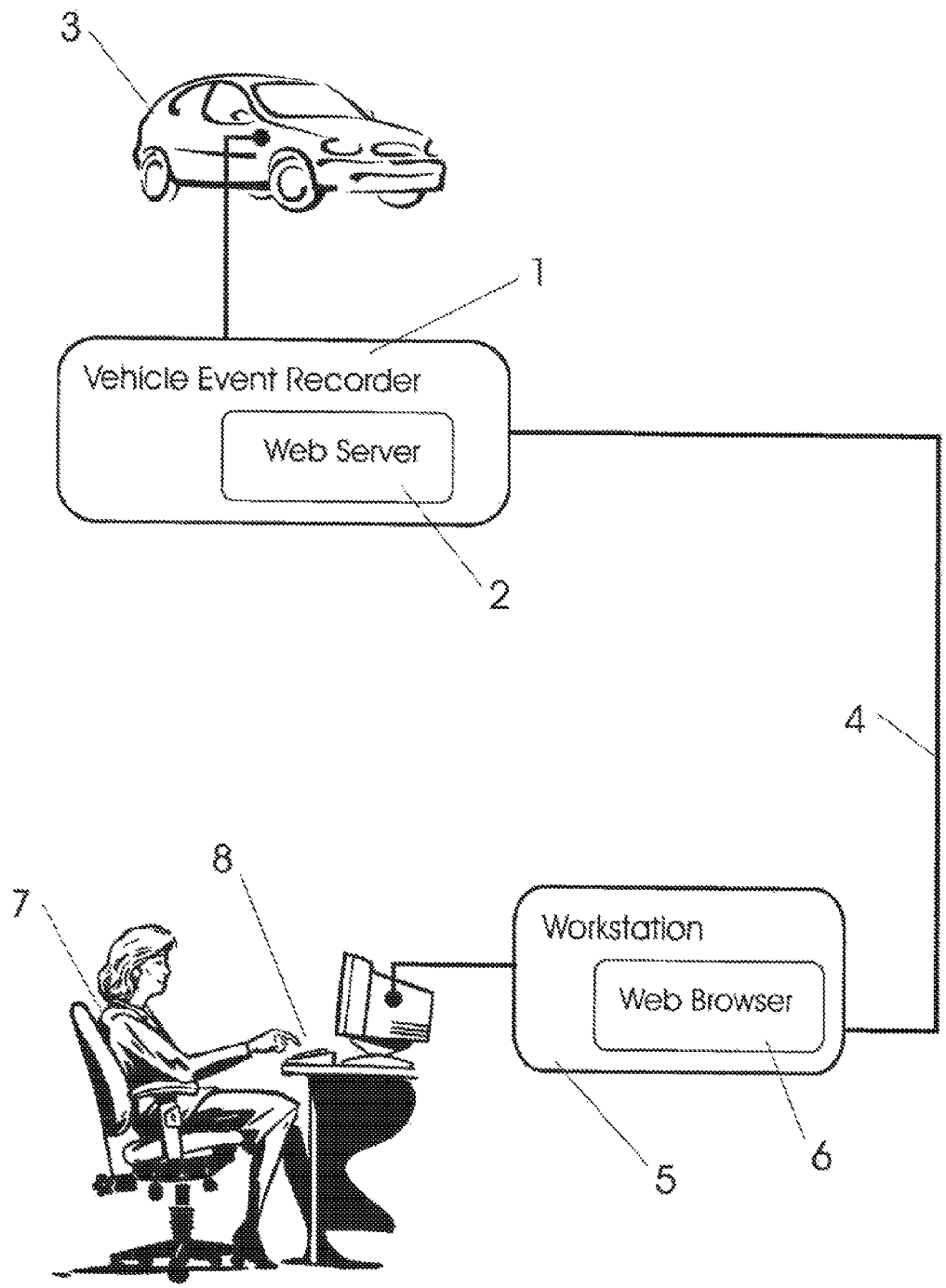
FIG. 1 is a simple block diagram showing relationships between primary elements of systems of these inventions.

Throughout this disclosure, reference is made to some terms which may or may not be exactly defined in popular dictionaries as they are defined here. To provide a more precise disclosure, the following terms are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must use the context of use and liberal discretion to arrive at an intended meaning. One will be well advised to error on the side of attaching broader meanings to terms used in order to fully appreciate the depth of the teaching and to understand all the intended variations.

Web Browser

A web browser is a computer graphical user interface operable for receiving computer flies and presenting a graphical display which may have interactive elements sometimes called 'controls' or web controls. Further, a browser is operable for sending requests in the form of a computer file—generally both received and sent files are in a format such as XML or more familiarly HTML.

Web Server

A web server is implemented as a special module of a computer and is operable for exchanging information via computer files—generally files in XML/HTML formats. A web server receives requests and returns responses to external parties via a communications link.

Web Request

A web request is a data transmission arranged in agreement with internet protocol directed to a specific web server.

Web Response

A web response is a data transmission by a web server arranged in agreement with Internet protocol and directed toward a requesting agent usually a web browser.

Physical Anomaly

Any change in a prescribed physical parameter which is defined as outside the scope of normal operating conditions.

Managed Loop Memory

A 'managed loop memory' is a memory system arranged to preserve in detail data captured during a period immediately past with respect to any instant but to overwrite that data with newer data when that data has sufficiently aged in accordance with a predefined expiration definition.

Vehicle Environments

The environment in and about a vehicle includes those spaces interior or exterior with respect to the car body. That is to say, traffic ahead of, behind, towards the sides of, and inside the driver compartment are all included as vehicle environments.

Communications Port

Includes means for supporting a data communications link including a transceiver or modem arrangement and suitable connection apparatus. Some examples include: a mobile cellular transceiver; WiFi; WiMax; bluetooth; Ethernet; serial port such as RS-232; among others.

PREFERRED EMBODIMENTS OF THESE INVENTIONS

In accordance with each of preferred embodiments of these inventions, vehicle event recorders having integrated Web servers are provided. It will be appreciated that each of embodiments described include apparatus and that the apparatus of one preferred embodiment may be different than an apparatus of an alternative embodiment.

Vehicle event recorders first presented here are generally characterized as including: a video camera, microprocessor, memory, and web server module. Video images are captured during use of the vehicle. When a particular 'event' occurs, a captured video series is saved to a durable memory. When the vehicle is returned to a location where network connectivity is available, the captured video series is made available for review via a web server. The integrated web sewer, when connected to a TCP/IP network, can receive requests for information from external web browsers. These requests for information may be directed as requests to view data captured during a recent previous operation period. The web server is suitably coupled to a memory whereby data and files stored there may be transferred to the requesting web browser. Accordingly, web servers of these systems expose data captured by the device, including video data of scenes about the vehicle captured during vehicle use. In addition, these web servers are also coupled to system settings and operational parameters whereby adjustments to those settings and parameters may be effected via a web browser. For example, trigger threshold values may be set to be more or less sensitive. An event trigger system arranged to detect an abrupt acceleration action may include an adjustable sensitivity level. Via web browser interface, the event trigger threshold can be set by a remote user operating a standard web browser in communication with the device web server. A web server is part of a complement pair which forms a user interface system. A web server and web browser connected together via a TCP/IP network form an interface system which is convenient and very powerful. Complete control of the device is permitted because prerecorded "web pages" or "web forms" may be prepared as part of the web server. These pages and the controls thereon may be coupled to physical systems of the device. In this way, the user having no other tools than a standard computer with a web browser is able to completely interface with the system. As such, proprietary software and the complexity and inconvenience associated therewith are completely eliminated.

With reference to FIG. 1, the reader will gain further appreciation of architecture relating to apparatus of these inventions. In particular, vehicle event recorder head unit 1 with integrated web server 2 is installed in a motor vehicle such as a common family car 3. The vehicle event recorder head is coupled by way of a data communications link 4, preferably a TCP/IP network to a computer workstation 5 operable for running a web browser 6. The arrangement provides a graphical user interface to a remotely located user 7, and further, means of remote input and interaction with the vehicle event recorder by way of common computer keyboard 8 for example. A user, in the comfort of a computer workplace, can provide a vehicle event recorder mounted in an automobile with instruction, update, interaction, download, review, among others. Functionality exposed by the vehicle event recorder becomes available to users working at a workstation by way of a common computer or 'Internet browser' graphical user interface. For example, a user can use simple browser control interfaces to set the camera contrast and brightness while at a workstation not in, or even not near, the car.

A vehicle event recorder with integrated web server is installed in the vehicle whereby a video camera has a clear view of the space and surroundings in front of the car. In this way, should the unfortunate occasion of a traffic accident occur, the video camera can provide a video record of traffic conditions and events leading up to the accident. A video series, including images captured just prior and just after an event moment as initiated by an event trigger, the series relating to an accident, is saved in a vehicle event recorder local memory. At a later time, when the vehicle is appropriately coupled to a workstation by suitable communications link, video series data can be transferred to the workstation where it may be further viewed and analyzed. A vehicle may be coupled to a workstation by communications link of several alternative forms including at least an Ethernet hardware connection, a WiFi wireless communications link, a Bluetooth communications link, a wireless mobile telephone network link, among others. Workstations used in these arrangements are of the type common to nearly every desktop in every home or office. While a workstation alone is insufficient for interacting with vehicle event recorders of these inventions, a workstation with a 'web browser' or 'Internet browser' such as the Windows™ Internet Explorer is an ideal combination for providing access to vehicle event recorders so arranged. Of course, competing web browsers such as Firefox, Opera, Konqueror, Safari, Gecko, et cetera may be used with nearly identical effect. In all cases, these browsers will communicate with a vehicle event recorder because they all can read, parse and produce appropriate XML and HTML transactions. Thus, it is not necessary for users of these systems to buy, subscribe to, install, learn to use, maintain, update, re-install, among others, any proprietary software. Rather, these vehicle event recorders expose their functionality to any computer running a web browser of a user's choice.

In all prior art versions of similar systems, workstations are coupled to vehicle event recorders by way of proprietary application-specific software running on the workstation. Thus, it is impossible in those systems to manipulate and control a vehicle event recorder with a general purpose computer not having specially prepared programming. Data exchanges between a workstation application of the prior art and those vehicle event recorders typically include proprietary calls and file and object formats not compatible with general-purpose applications. In contrast, as the unique vehicle event recorders first presented here include a built-in web server, users have access to inner workings and settings of the vehicle event recorder by way of 'http' transactions. Further, simple data transfer including large video files may be taken up and handled by the same web server or by an accompanying ftp (file transfer protocol) server.

In some preferred versions, data communications link 4 is a common home network. A vehicle parked in the household garage becomes coupled to the home network by way of its proximity to a WiFi router for example. When a teenage driver returns home, mom instantly has access to information including video of her children's driving activity by way of her internet browser.

Figure 2:
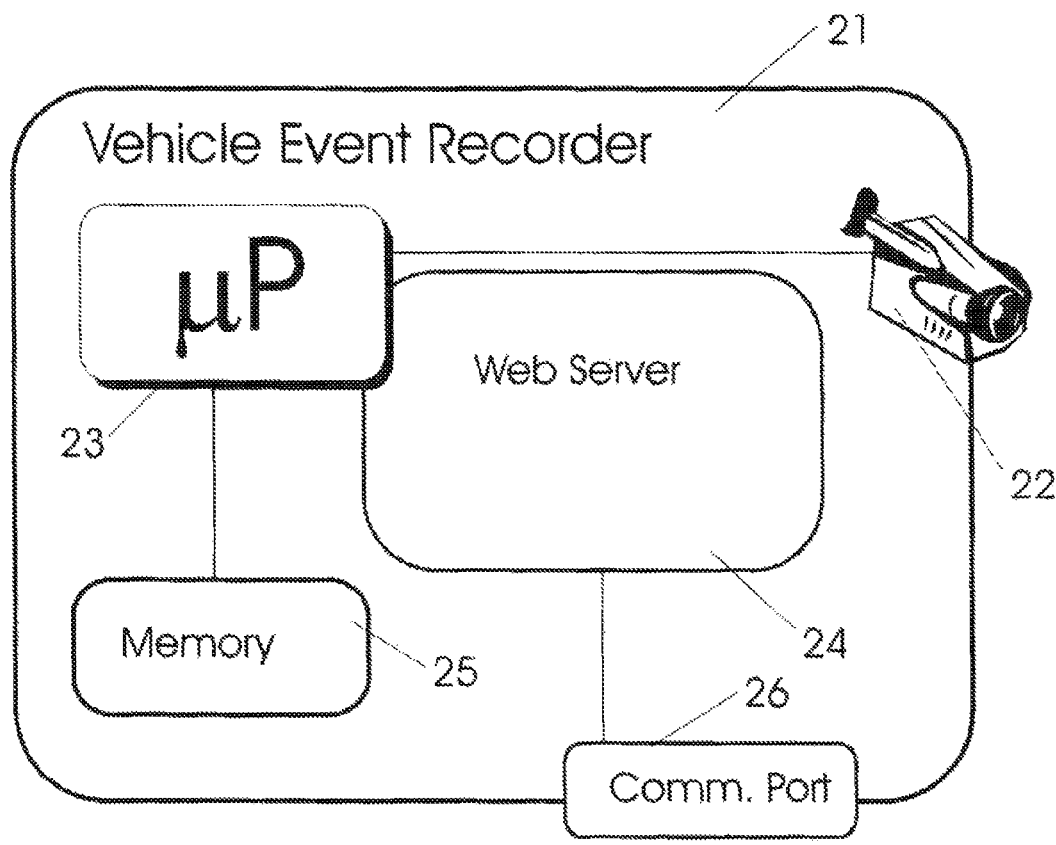
FIG. 2 is a block diagram of a vehicle event recorder head.

A top-level block diagram of a video event recorder is presented as FIG. 2. Video event recorders 21 of these inventions are comprised of the primary elements including: a video camera 22, a microprocessor 23, a web server 24, memory 25, and a communications port 26. A typical arrangement of a vehicle event recorder includes having these elements combined within a small plastic housing suitable for being mounted near or at a car windshield. It is preferable to install these devices on the interior portions of a vehicle in the passenger/occupant space. While the elements described together in combination form a vehicle event recorder head, sometimes reference herein is made to a 'vehicle event recorder system'. When a head unit is coupled with a network or communications path which includes a workstation or other server remote from the vehicle event recorder head, the ensemble is considered a 'vehicle event recorder system'.

Figure 3:
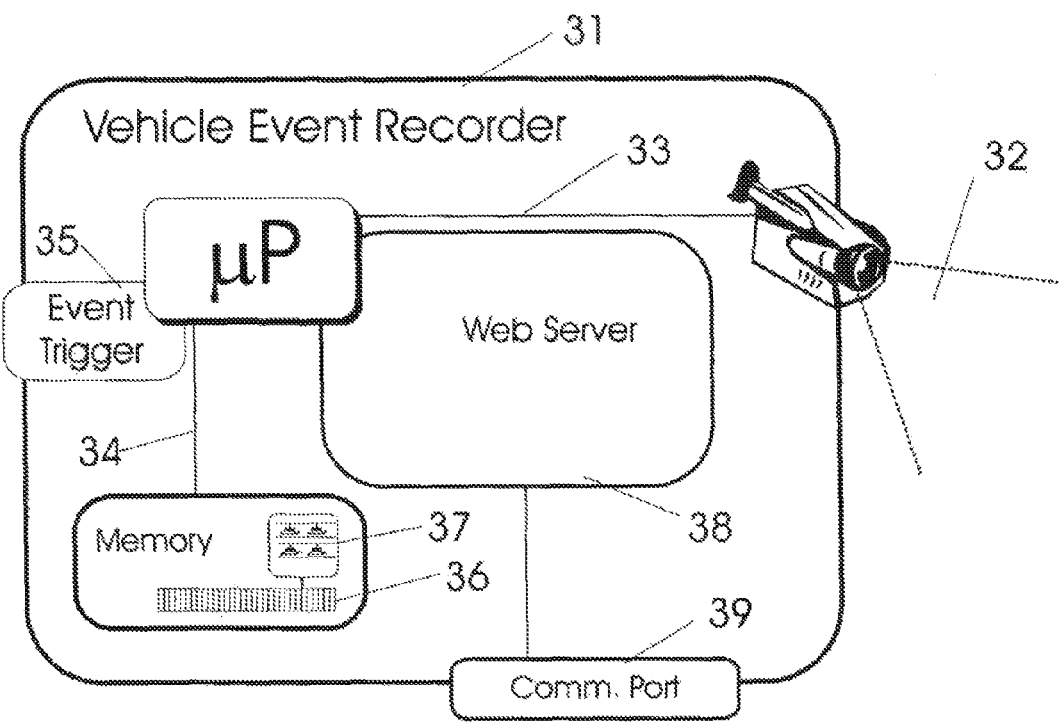
FIG. 3 illustrates the relationship a vehicle event recorder video camera has with its exterior and further illustrates other important elements of the vehicle event recorder head.

FIG. 3 presents further detail with regard to the architecture of these vehicle event recorders 31. The camera field-of-view 32 may be arranged in 'forward looking' direction such that images of activity ahead of the vehicle are captured by the camera. Thus, it is said that the camera is coupled to environments about the vehicle. The video camera is further coupled electronically 33 to the microprocessor whereby the camera may transmit image data thereto. The microprocessor is further coupled electronically 34 to a memory which may be managed by the microprocessor to store image series associated with particular events such as traffic accidents. For example, upon receipt of signal from an event trigger 35, a short video series stored in managed loop memory 36, may be transferred to a more permanent stable memory, such as a high-capacity flash type memory 37. Finally, the web server 38 is coupled to a communications port 39 which permits the web server to interact with exterior computing systems.

In some preferred versions, cameras are arranged as forward looking cameras, others are rearward looking cameras, and still others as driver compartment view cameras. The number of cameras associated with a single vehicle recorder unit is meant to be not limited to one.

In preferred versions, a local memory is arranged to capture and preserve video information associated with a time prior to, and alter, an important event. A managed loop memory includes an overwrite process which preserves data for a limited time and overwrites data as soon as it has aged in accordance with an overwrite scheme. Upon the occurrence of a 'triggered event'—a car crash for example—the loop memory data is transferred to a buffer where it may be saved without subject to overwrite for an extended time.

An event trigger is arranged to detect a physical anomaly such as a high acceleration associated with a crash or other impact; alternatively a heavy swear or excessive braking maneuver; or even as a response to a panic button strike. The event trigger declares the occurrence of an incident and sets the memory to preserve all data associated with the incident or event.

A web server of these systems preferably includes pre-formed 'web pages' or sometimes 'web forms'. In some advanced versions, these can be arranged in accordance with the Microsoft technology ASP.NET or sometimes referred to as Active Server Pages. These pages offer great latitude in providing web controls which are coupled to the internal systems of the vehicle event recorder systems. For example, the video camera may be controlled in that its contrast, brightness and intensity can be manipulated via such web controls on ASP-NET pages.

Because a car is easily coupled to a home computer network via a WiFi system, preferred versions include vehicle event recorder units having an output port fashioned as a WiFi or WiMax transceiver. Alternatives may include other radio type transceivers such as bluetooth, or optical type wireless links such as those which exploit infrared optical coupling. Of course, while not as convenient, it is entirely possible that a parked car be coupled to a home network via a hardwired Ethernet connection. A vehicle event recorder arranged with a common network interface card could be plugged in with hardwire (RJ45 type connector) to a local Ethernet system.

A web server is sometimes considered a part of the microprocessor or other computing platform, as it may be embodied as a computer code module running thereon. In FIG. 3, it is drawn separately from the microprocessor to bring emphasis to its importance. While known vehicle event recorders have been arranged with common microprocessors, it is first suggested here that a web server module be included and provide interface between a vehicle event recorder microprocessor and an external computing system. In this way, access to the microprocessor and vehicle event recorder subsystem functionality is provided to any computer system which address the web server with appropriate http transactions. That is, the web server is arranged to receive well-formed http requests (in example, http 'GET' commands), and further to provide responses constructed as http answers (http 'POST' responses).

Figure 4:
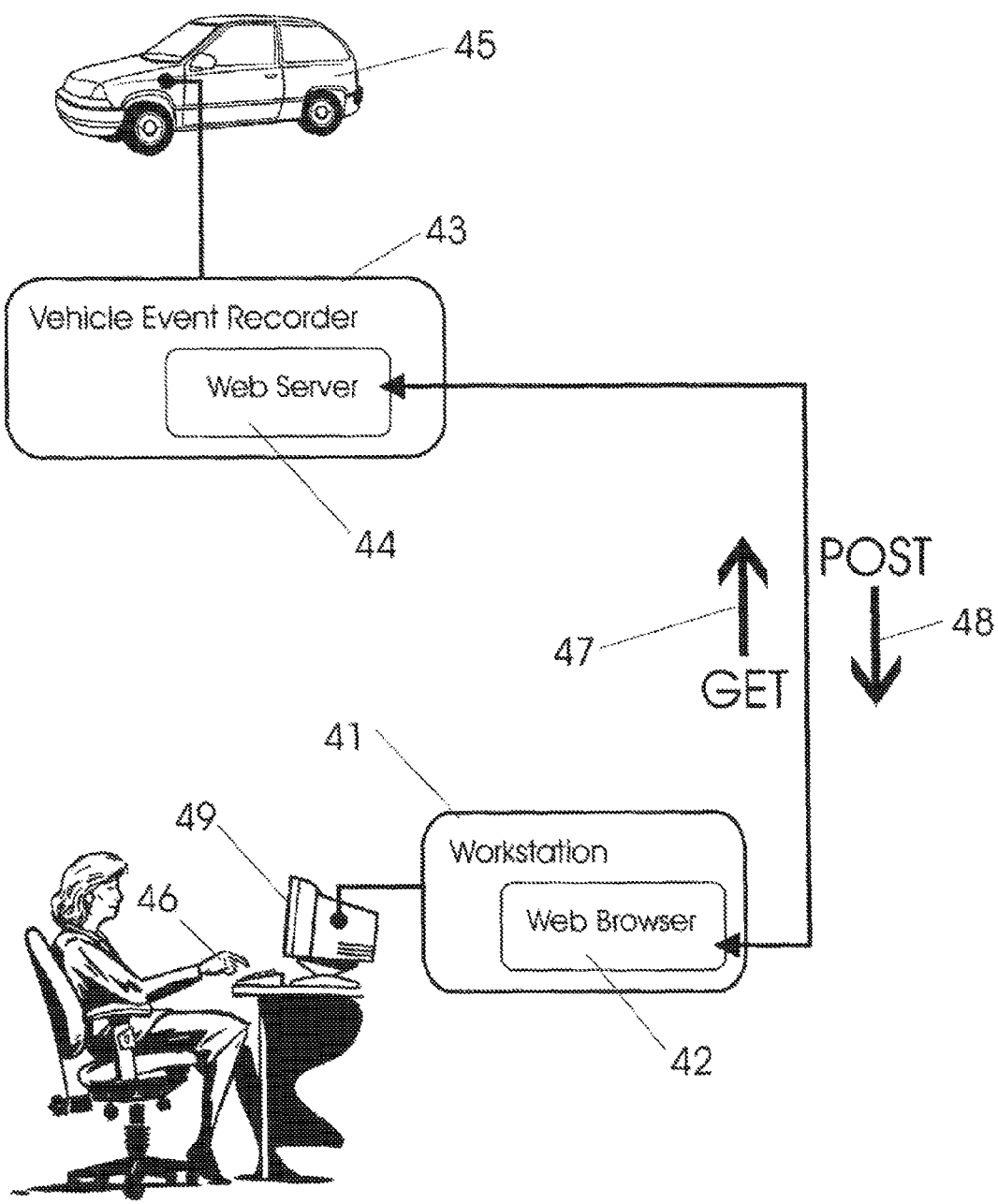
FIG. 4 illustrates transactions over a network element of these vehicle event recorder systems.

FIG. 4 illustrates more clearly a particular example of a transaction between a user operating at a computer workstation 41, with installed Web browser 42, linked by a communications link to a vehicle event recorder 43 having integrated web-server 44 installed in a common family automobile 45. From the workstation keyboard, the user 46 may inquire as to the state of the vehicle event recorder by sending an http request in the form of a GET type command 47. A GET command is fashioned as an http request and includes the URL of the source being addressed—the 'web address' of the vehicle event recorder; and perhaps an introduction web form or home/default web form. For example, a particular web page providing access to certain desired functionality may have a URL as follows: "http://192.168.1.8/camerasettings.aspx". A GET command 47 including that URL is formed by and transmitted from the workstation's web browser to the vehicle event recorder's web server (having IP address 192.168.1.8). Upon receipt of the GET command, the web server responds by providing a POST action 48—an http response. The POST action may include transmission of an XML or/and HTML coded web page, which may be appropriately interpreted and displayed by the web browser and its graphical user interface or sometimes 'window' presented to the user on a system monitor 49.

Figure 5:
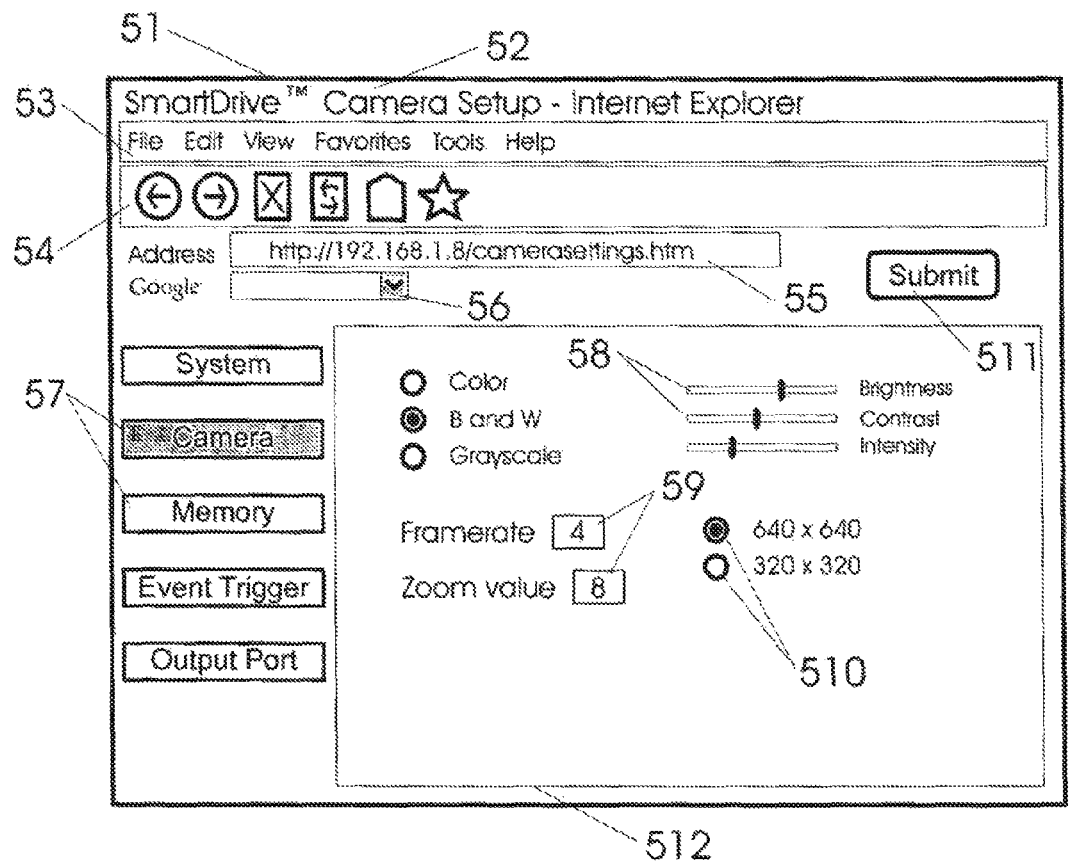
FIG. 5 illustrates an example browser type user interface associated with these systems.
Figure 6:
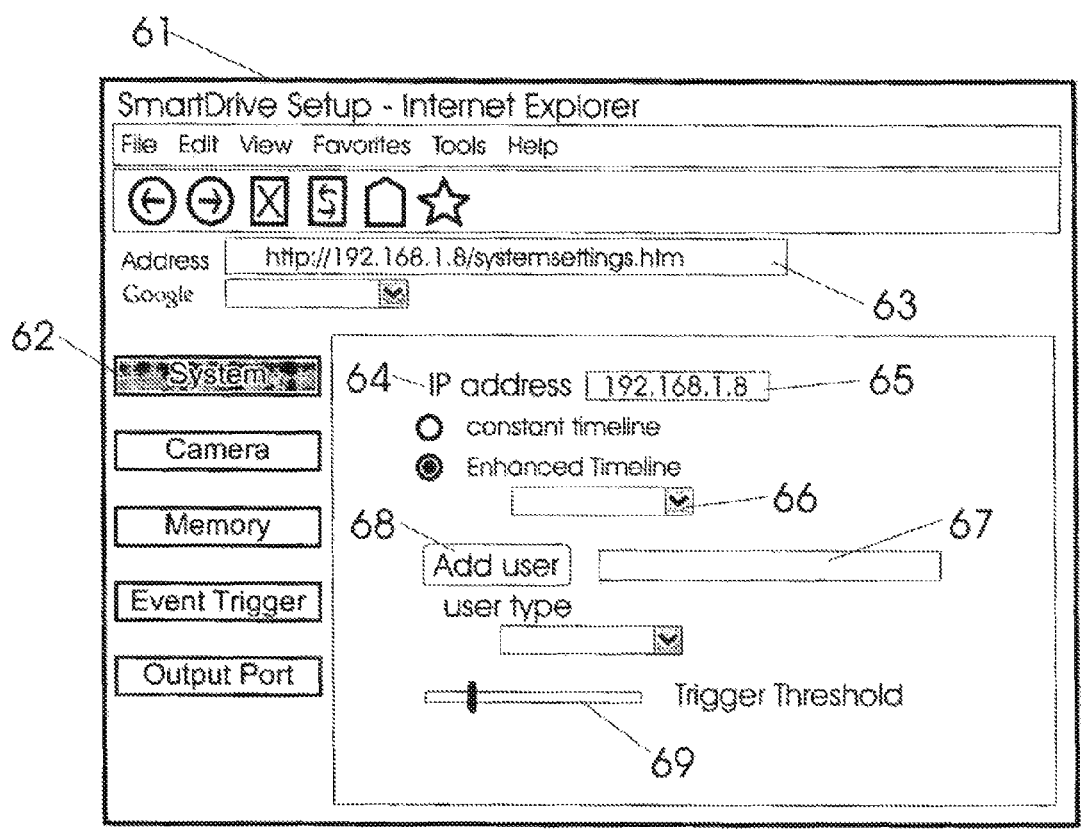
FIG. 6 illustrates a second page of a browser having various system control functions which may be manipulated via the browser.

To better explain what is meant by the phrase: 'the state of the vehicle event recorder' presented above, one might consider the following text in conjunction with the drawing presented as FIG. 5. FIG. 5 illustrates an example of a web page served by the web server of a vehicle event recorder. A web page is sometimes comprised a interactive objects sometimes and herein referred to as "web controls". These include such controls commonly known as: 'menus'; 'toolbars'; 'drop-down boxes'; 'listboxes'; 'radio buttons'; 'checkboxes'; 'sliders'; 'textboxes', among others. In FIG. 5, browser window 51 includes a field having a page title 52: "SmartDrive™ Camera Setup". Further, the browser window includes a graphical element known as a menu or menu bar 53, and toolbar 54. Icons associated with various functionality are laid across a horizontal strip. When a user 'clicks' any of these icons, it sets into motion a computer code module to effect some operation. A very important aspect of any web browser include the address line 55. An address line may contain the URL or web address of the source currently displayed. This address may be typed-in manually by a user, or it may have been arrived at by way of a hyperlink from another page displayed previously in the browser window. Typical web browser windows further include other interactive objects such as a search engine interface including a dropdown box 56, a command button controls 57, slider controls 58, textboxes 59, an 'option' or radio buttons 510. From these web controls, a user interface is brought about and designed for interaction with the available functions in a vehicle event recorder hosting the associated web pages on its web server. A user may adjust a control and thereafter send the state of the web page to the vehicle event recorder unit. This is accomplished by 'pointing' and 'clicking' to change the control settings and then submitting the page or posting the page to the web server in the vehicle event recorder. In example, one may adjust the contrast of the camera by using slider control 58 and thereafter submit button 511 which results in the page being posted back to the web server and ultimately the contrast being improved. A careful observer will note that each of command button controls 57 may lead to a different association of certain functions in groups. The functions of the camera are grouped into those which are displayed in that field 512. If the command button associated with system functions is chosen, then the available functions in field may change without appreciable change to the general form of the page. FIG. 6 illustrates.

A group of controls associated with system function is presented in the diagram of FIG. 6 which is a graphical user interface embodied as a web page 61. Command button control 62 associated with the system settings is called at the browser by way of this page's URL http://192.168.1.8/systemsettings.htm 63. The page permits a user to adjust the IP address 64 of the vehicle event recorder at textbox 65. A user may choose a particular enhanced timeline at a drop down box 66 as prescribed by those available in a managed loop memory system. User data/profile can be entered at textbox 67 and command button 68 can be used to save a username to a memory in the vehicle event recorder. Finally, a trigger threshold can be set on a continuous slider control 69 to make an event trigger in the vehicle event recorder either more or less sensitive. In this way, a user at a remote computer running a simple internet browser makes adjustments directly to a vehicle event recorder installed in a vehicle.

While sometimes these web servers are arranged with pre-programmed 'web page' objects addressable via web request actions, they may also include programmed modules known as web services. These functions, properties and events, do not have a user interface associated with them, however they include transaction interface which permits their being addressed via TCP/IP web requests. These functions, properties and events may be coupled to subsystems of the vehicle event recorder head. For example, an 'authorized users list' may be adjusted whereby log-on actions by users are enabled/disabled. This web service may be taken up automatically in response to some condition being met. Therefore, without user interaction via a web page, but rather by purely automated processes, i.e. web services, these vehicle event recorder systems may be adjusted and otherwise manipulated.

Figure 7:
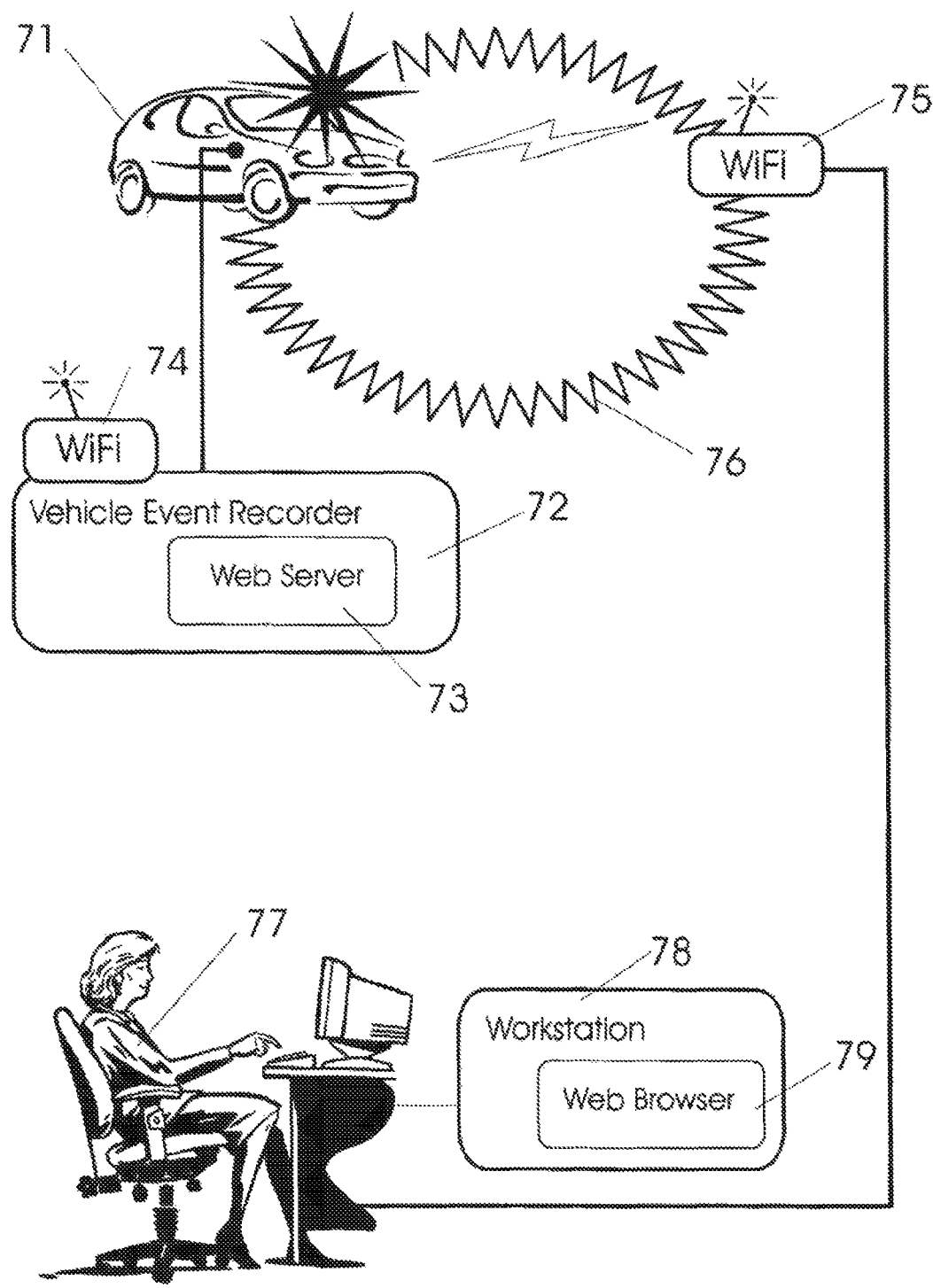
FIG. 7 illustrates an important network architecture and connection associated with these systems.

Best modes of these inventions are illustrated in FIG. 7. A vehicle 71 is prepared with a vehicle event recorder unit 72 having therewith an integrated web server 73. A communications port, in example a WiFi transceiver 74 permits the vehicle event recorder to connect wirelessly to a home network by way of complimentary WiFi transceiver/router 75. When the car enters a zone or space 76 served by the transceiver/router, the vehicle event recorder web server is accessible by a user 77 operating workstation 78 running a web browser 79 program. The user may adjust, upload, download, browse, and otherwise interact with the vehicle event record and data stored on the vehicle event recorder.

Figure 8:
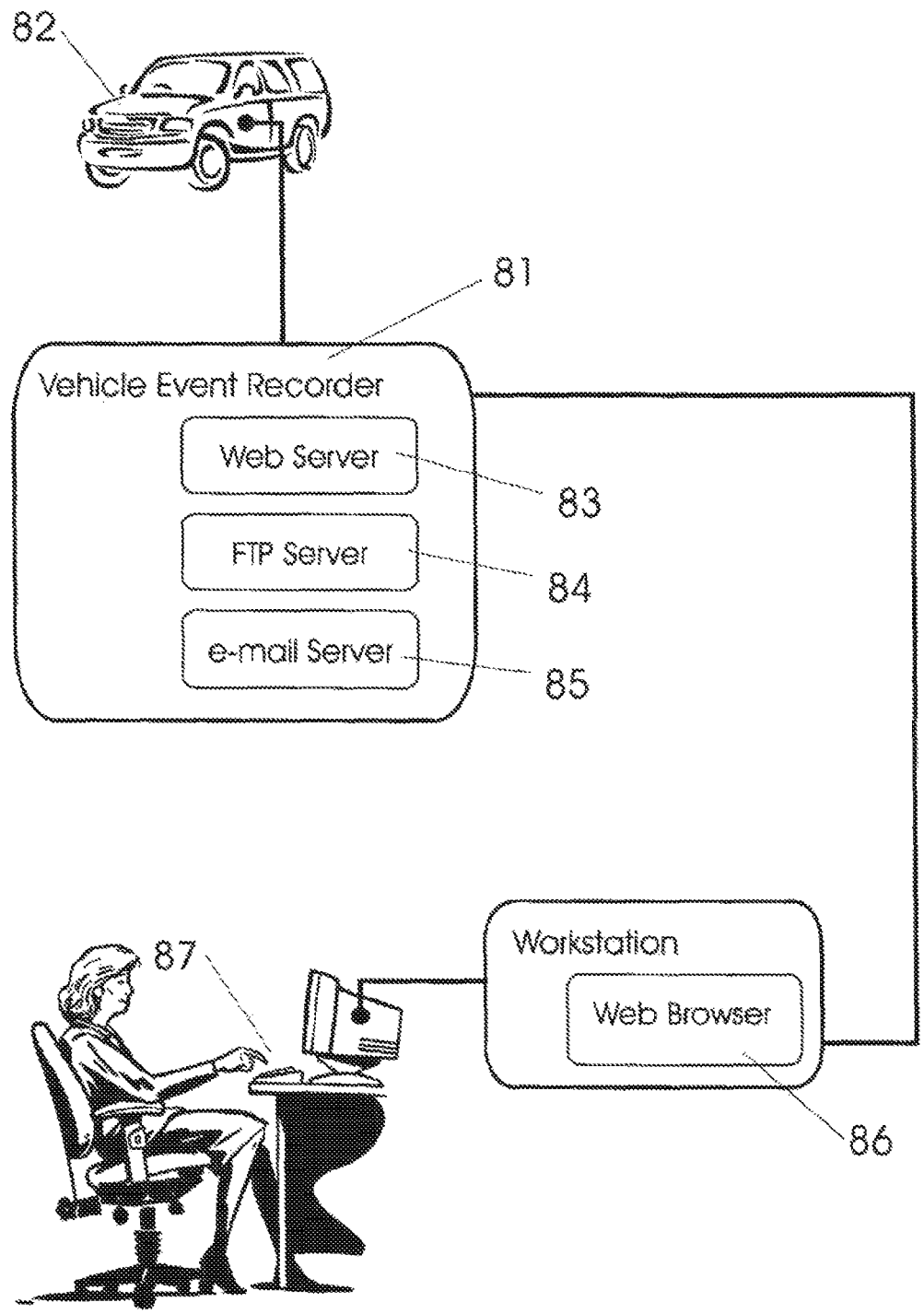
FIG. 8 illustrates in diagram several additional important functions which may be incorporated within a vehicle event recorder head.
Figure 9:
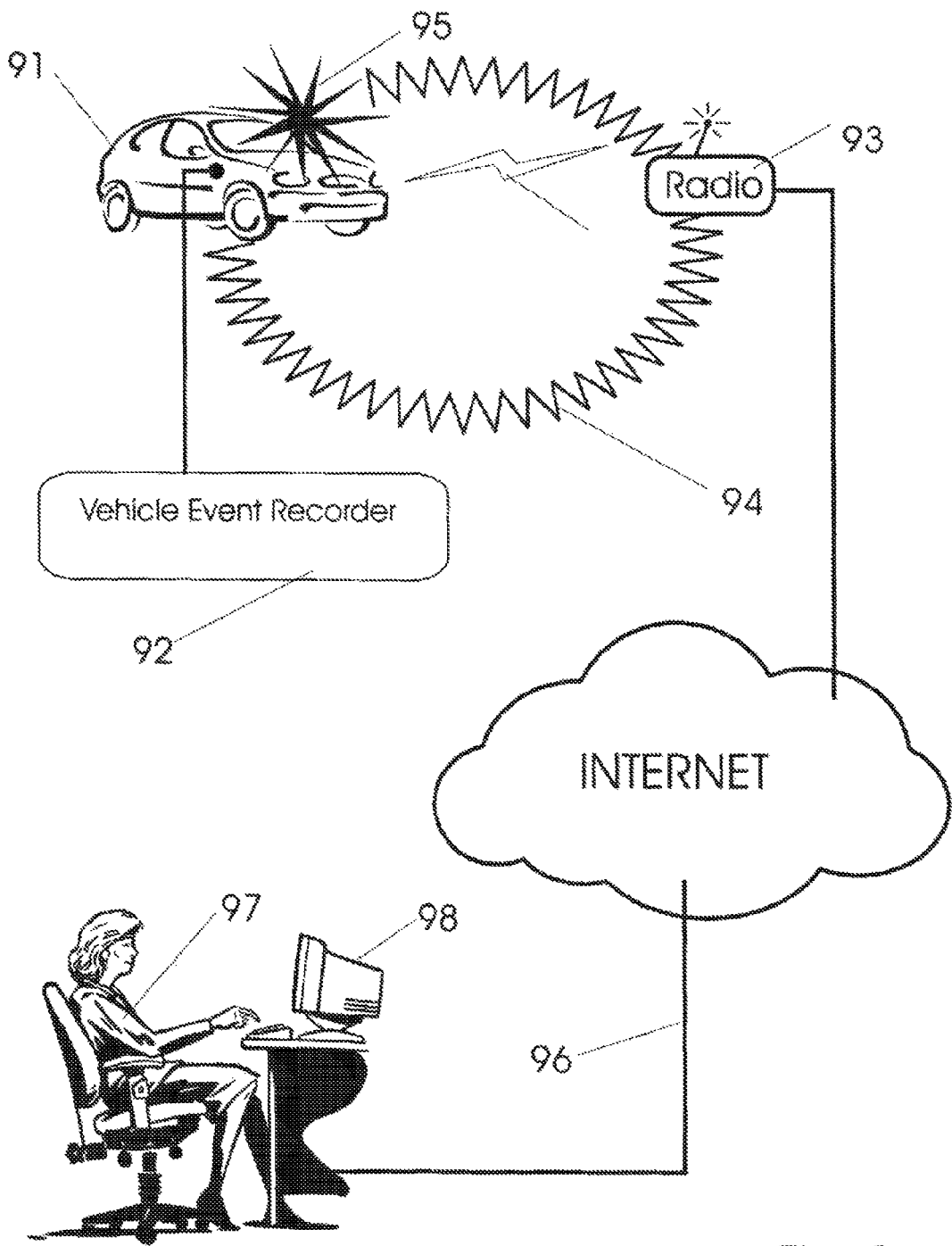
FIG. 9 illustrates an important network configuration which permits remote access to vehicle event recorder heads.

In special advanced versions, vehicle event recorders additionally include modules other than a simple web server. For example, an vehicle event recorder may additionally include a file exchange and e-mail server systems. FIG. 8 shows graphically a vehicle event recorder 81 for use in conjunction with vehicle 82, the vehicle event recorder comprising an integrated web server 83, a file transport protocol ftp server 84, and an e-mail (SMTP) server 85. The web browser 86 at a user workstation 87 similarly communicates with these elements in a conventional way to bring about these functions in a vehicle event recorder. In this way, automatic triggers can be arranged in the vehicle event recorder such that it can send e-mail messages in response to certain events having been 'fired' in the normal processing of the system. When something of interest occurs, an e-mail message is prepared and queued. On the next occasion where the vehicle event recorder is connected to the internet, the SMTP sends the e-mail to the intended recipient. In a similar fashion, the vehicle event recorder ftp server operates to send and receive data files.

While most preferred versions are arranged with the primary objective being a home, family or small number user local systems, these inventions are also meant to include as a special case the need for remote operation. A private home computer network can be arranged with a public port which exposes certain services through a firewall to the public internet. In this way, a vacationing parent can still have a look at the vehicle use records from afar. Vehicle 91 equipped with vehicle event recorder 92 having integrated web server communicates with local radio 93 as it enters communications space 94. the mere act of the vehicle entering 95 the space causes the vehicle event recorder to become connected to the network which may include the Internet. Accordingly, a communications link 96 of many thousands of miles is possible whereby a user 97 working on any workstation 98 equipped with a browser can address the web, file and mail servers of the remotely located vehicle event recorder.

One will now folly appreciate how a vehicle event recorder having an integrated web server is used to provide simple user access to operation and function of these systems. Although the present inventions have been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

It is claimed:

1. A vehicle event recorder comprising:
a video camera configured to acquire visual information representing a vehicle environment, the vehicle environment including spaces in and around an interior of a vehicle and an exterior of the vehicle;
a memory configured to electronically store information; and
a microprocessor configured by machine-readable instructions to:
detect a vehicle event based on vehicle performance information, wherein detection uses an adjustable sensitivity level;
responsive to detection of the vehicle event, effectuate storage of visual information associated with the vehicle event in the memory;
facilitate wireless communication of information between the vehicle event recorder and a remotely located computing device using HyperText Transfer Protocol (HTTP); and
adjust the adjustable sensitivity level based on information received from the remotely located computing device.

2. The vehicle event recorder of claim 1, wherein the microprocessor is further configured by machine-readable instructions to cause communication of the visual information associated with the vehicle event stored in the memory to the remotely located computing device.

3. The vehicle event recorder of claim 2, wherein the remotely located computing device:
determines an adjustment to the adjustable sensitivity level, wherein the adjustment is based on one or more previously detected vehicle events; and
communicates the adjustment to the microprocessor, and wherein the microprocessor adjusts the adjustable sensitivity level based on the adjustment received from the remotely located computing device.

4. The vehicle event recorder of claim 1, wherein the microprocessor is further configured by machine-readable instructions to adjust the adjustable sensitivity level based on information received from a user via the remotely located computing device.

5. The vehicle event recorder of claim 4, wherein the microprocessor is further configured by machine-readable instructions such that facilitating wireless communication includes generating one or more web pages for presentation to the user via a web browser on the remotely located computing device, and wherein the one or more web pages are configured to receive entry and/or selection of the information from the user.

6. The vehicle event recorder of claim 5, wherein the microprocessor is further configured by machine-readable instructions such that the one or more web pages comprise one or more fields configured to receive entry and/or selection of the information from the user.

7. The vehicle event recorder of claim 1, wherein the microprocessor is further configured by machine-readable instructions such that the detection of the vehicle event is based on the vehicle performance information breaching an event trigger threshold level.

8. The vehicle event recorder of claim 7, wherein the microprocessor is further configured by machine-readable instructions such that the adjustable sensitivity level is adjusted by an increase and/or decrease in the event trigger threshold level.

9. The vehicle event recorder of claim 8, wherein the vehicle performance information is based on an acceleration of the vehicle, and wherein the event trigger threshold level is an acceleration threshold level.

10. The vehicle event recorder of claim 1, further comprising an output port configured to facilitate the wireless communication between the vehicle event recorder and the remotely located computing device.

11. The vehicle event recorder of claim 1, further comprising
an e-mail server,
wherein the microprocessor is further configured by machine-readable instructions to:
prepare an e-mail message responsive to the detection of the vehicle event; and
send the e-mail message using the e-mail server.

12. A computer implemented method for adjusting vehicle event recorder settings with the vehicle event recorder, the vehicle event recorder comprising a video camera, an electronic memory, and a microprocessor, the method comprising:
acquiring, with the video camera, visual information representing a vehicle environment, the vehicle environment including spaces in and around an interior of a vehicle and an exterior of the vehicle;
detecting a vehicle event based on vehicle performance information, wherein detection uses an adjustable sensitivity level;
responsive to detecting the vehicle event, effectuate, with the microprocessor, storage of visual information associated with the vehicle event in the electronic memory;
facilitating, with the microprocessor, wireless communication of information between the vehicle event recorder and a remotely located computing device using HyperText Transfer Protocol (HTTP); and
adjusting, with the microprocessor, the adjustable sensitivity level based on information received from the remotely located computing device.

13. The method of claim 12, further comprising causing communication of the visual information associated with the vehicle event stored in the electronic memory to the remotely located computing device.

14. The method of claim 13, further comprising:
determining an adjustment to the adjustable sensitivity level, wherein the adjustment is based on one or more previously detected vehicle events;
communicating, by the remotely located computing device, the adjustment to the microprocessor;
wherein adjusting the adjustable sensitivity level is based on the adjustment received from the remotely located computing device.

15. The method of claim 12, further comprising adjusting the adjustable sensitivity level based on information received from a user via the remotely located computing device.

16. The method of claim 15, wherein facilitating wireless communication includes generating one or more web pages for presentation to the user via a web browser on the remotely located computing device, wherein the one or more web pages receive entry and/or selection of the information from the user.

17. The method of claim 16, wherein the one or more web pages comprise one or more fields that receive entry and/or selection of the information from the user.

18. The method of claim 12, wherein the detection of the vehicle event is based on the vehicle performance information breaching an event trigger threshold level.

19. The method of claim 18, wherein adjusting the adjustable sensitivity level is accomplished by an increase and/or decrease in the event trigger threshold level.

20. The method of claim 19, wherein the detection of the vehicle event is based on an acceleration of the vehicle, and wherein event trigger threshold level is an acceleration threshold level.

21. The method of claim 12, further comprising facilitating the wireless communication between the vehicle event recorder and the remotely located computing device with an output port of the vehicle event recorder.

* * * * *